US012700905B2

(12) United States Patent
Park et al.

(10) Patent No.: US 12,700,905 B2
(45) Date of Patent: Aug. 4, 2026

(54) METHOD AND DEVICE FOR TRANSMITTING AND RECEIVING CHANNEL STATE INFORMATION IN WIRELESS COMMUNICATION SYSTEM

(71) Applicant: LG Electronics Inc., Seoul (KR)

(72) Inventors: Haewook Park, Seoul (KR); Kyuseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 18/685,075

(22) PCT Filed: Aug. 19, 2022

(86) PCT No.: PCT/KR2022/012427
§ 371 (c)(1),
(2) Date: Feb. 20, 2024

(87) PCT Pub. No.: WO2023/022565
PCT Pub. Date: Feb. 23, 2023

(65) Prior Publication Data
US 2024/0356609 A1     Oct. 24, 2024

(30) Foreign Application Priority Data
Aug. 20, 2021     (KR) ........................ 10-2021-0110505

(51) Int. Cl.
*H04B 7/06*          (2006.01)
(52) U.S. Cl.
CPC ......... *H04B 7/0626* (2013.01); *H04B 7/0639* (2013.01)
(58) Field of Classification Search
None
See application file for complete search history.

(56) References Cited

U.S. PATENT DOCUMENTS

2018/0175993 A1*   6/2018   Onggosanusi ....... H04B 7/0417
2020/0186207 A1*   6/2020   Davydov ............ H04B 7/0658
(Continued)

FOREIGN PATENT DOCUMENTS

WO     WO 2021/148629        7/2021

OTHER PUBLICATIONS

Extended European Search Report in European Appln. No. 22858802. 6, mailed on Jul. 29, 2025, 11 pages.
(Continued)

*Primary Examiner* — Ayman A Abaza
*Assistant Examiner* — Camquyen Thai
(74) *Attorney, Agent, or Firm* — Fish & Richardson P.C.

(57)          ABSTRACT

A method and a device for transmitting and receiving channel state information in a wireless communication system are disclosed. A method for transmitting channel state information (CSI) according to one embodiment of the present disclosure may comprise the steps of: receiving configuration information related to CSI from a base station; receiving a CSI-reference signal (CSI-RS) on one or more CSI resources from the base station; and transmitting the CSI to the base station on the basis of the configuration information. The CSI may include a precoding matrix indicator (PMI) corresponding to indexes of a codebook for indicating a precoding matrix, and the PMI may include one or more amplitude coefficient indicators for indicating an amplitude coefficient and/or one or more phase coefficient indicators for indicating one or more phase coefficients.

7 Claims, 27 Drawing Sheets

Receive configuration information related to CSI ——S801

Receive CSI-RS on one or more CSI resources ——S802

Transmit CSI ——S803

(56)           References Cited

U.S. PATENT DOCUMENTS

| | | | |
|---|---|---|---|
| 2021/0184742 A1* | 6/2021 | Gao | H04L 25/0226 |
| 2021/0211173 A1* | 7/2021 | Rahman | H04L 5/0091 |
| 2022/0039107 A1* | 2/2022 | Wei | H04W 72/21 |

OTHER PUBLICATIONS

Huawei, HiSilicon, "Discussion on CSI enhancement," 3GPP TSG RAN WG1 Meeting #96bis, Xi'an, China, R1-1903969, Apr. 2019, 19 pages.

Catt, "Discussion on CSI enhancements for Rel-17," R1-2106941, 3GPP TSG RAN WG1 Meeting #106-e, e-meeting, Aug. 16-27, 2021, 23 pages.

Intel Corporation, "On CSI enhancements for MTRP and FDD," R1-2107576, 3GPP TSG RAN WG1 #106-e, e-meeting, Aug. 16/27, 2021, 15 pages.

International Search Report in International Appln. No. PCT/KR2022/012427, mailed on Dec. 1, 2022, 5 pages (with English translation).

Samsung, "Views on Rel-17 CSI enhancements," R1-2106871, 3GPP TSG RAN WG1#106-e, e-Meeting, Aug. 16-27, 2021, 26 pages.

* cited by examiner

FIG.6

| Receive configuration information related to CSI | — S801 |
| Receive CSI-RS on one or more CSI resources | — S802 |
| Transmit CSI | — S803 |

| Transmit configuration information related to CSI | — S901 |
| Transmit CSI-RS on one or more CSI resources | — S902 |
| Receive CSI | — S903 |

FIG.11A

5.2.2.2.3      Type II Codebook

For 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and the UE configured with higher layer parameter *codebookType* set to 'typeII'

- The values of $N_1$ and $N_2$ are configured with the higher layer parameter *n1-n2-codebookSubsetRestriction*. The supported configurations of $(N_1, N_2)$ for a given number of CSI-RS ports and the corresponding values of $(O_1, O_2)$ are given in Table 5.2.2.2.1-2. The number of CSI-RS ports, $P_{CSI-RS}$, is $2N_1N_2$.

- The value of $L$ is configured with the higher layer parameter *numberOfBeams*, where $L=2$ when $P_{CSI-RS}=4$ and $L \in \{2,3,4\}$ when $P_{CSI-RS} > 4$.

- The value of $N_{PSK}$ is configured with the higher layer parameter *phaseAlphabetSize*, where $N_{PSK} \in \{4,8\}$.

- The UE is configured with the higher layer parameter *subbandAmplitude* set to 'true' or 'false'.

- The UE shall not report RI > 2.

When $\upsilon \le 2$, where $\upsilon$ is the associated RI value, each PMI value corresponds to the codebook indices $i_1$ and $i_2$ where $$i_1 = \begin{cases} \begin{bmatrix} i_{1,1} & i_{1,2} & i_{1,3,1} & i_{1,4,1} \end{bmatrix} & \upsilon = 1 \\ \begin{bmatrix} i_{1,1} & i_{1,2} & i_{1,3,1} & i_{1,4,1} & i_{1,3,2} & i_{1,4,2} \end{bmatrix} & \upsilon = 2 \end{cases}$$

$$\bullet \quad i_2 = \begin{cases} \begin{bmatrix} i_{2,1,1} \end{bmatrix} & subbandAmplitude = \text{'false'}, \upsilon = 1 \\ \begin{bmatrix} i_{2,1,1} & i_{2,1,2} \end{bmatrix} & subbandAmplitude = \text{'false'}, \upsilon = 2 \\ \begin{bmatrix} i_{2,1,1} \\ i_{2,2,1} \end{bmatrix} & subbandAmplitude = \text{'true'}, \upsilon = 1 \\ \begin{bmatrix} i_{2,1,1} & i_{2,1,2} & i_{2,2,1} & i_{2,2,2} \end{bmatrix} & subbandAmplitude = \text{'true'}, \upsilon = 2 \end{cases}$$

The $L$ vectors combined by the codebook are identified by the indices $i_{1,1}$ and $i_{1,2}$, where $$\bullet \quad i_{1,1} = \begin{bmatrix} q_1 & q_2 \end{bmatrix}$$
$$q_1 \in \{0,1,...,O_1-1\}$$
$$q_2 \in \{0,1,...,O_2-1\}$$

$$\bullet \quad i_{1,2} \in \left\{0,1,...,\binom{N_1 N_2}{L}-1\right\}.$$

Let $$n_1 = \begin{bmatrix} n_1^{(0)} ,..., n_1^{(L-1)} \end{bmatrix}$$
$$\bullet \quad n_2 = \begin{bmatrix} n_2^{(0)} ,..., n_2^{(L-1)} \end{bmatrix}$$
$$n_1^{(i)} \in \{0,1,...,N_1-1\}$$
$$n_2^{(i)} \in \{0,1,...,N_2-1\}$$

and $$\bullet \quad C(x,y) = \begin{cases} \binom{x}{y} & x \ge y \\ 0 & x < y \end{cases},$$

where the values of $C(x,y)$ are given in Table 5.2.2.2.3-1.

FIG.11B

Then the elements of $n_1$ and $n_2$ are found from $i_{1,2}$ using the algorithm:

$$s_{-1} = 0$$
$$\text{for } i = 0,\ldots,L-1$$

$\quad$ Find the largest $x^* \in \left\{ L-1-i, \ldots, N_1 N_2 -1-i \right\}$ in Table 5.2.2.2.3-1 such that $i_{1,2} - s_{i-1} \geq C\left( x^*, L-i \right)$ $$e_i = C\left( x^*, L-i \right)$$
$$s_i = s_{i-1} + e_i$$
$$n^{(i)} = N_1 N_2 - 1 - x^*$$
$$n_1^{(i)} = n^{(i)} \bmod N_1$$
$$n_2^{(i)} = \frac{\left( n^{(i)} - n_1^{(i)} \right)}{N_1}$$

When $n_1$ and $n_2$ are known, $i_{1,2}$ is found using:

$n^{(i)} = N_1 n_2^{(i)} + n_1^{(i)}$ where the indices $i = 0,1,\ldots,L-1$ are assigned such that $n^{(i)}$ increases as $i$ increases $i_{1,2} = \sum_{i=0}^{L-1} C\left( N_1 N_2 - 1 - n^{(i)}, L-i \right)$, where $C(x,y)$ is given in Table 5.2.2.2.3-1.

- If $N_2 = 1$, $q_2 = 0$ and $n_2^{(i)} = 0$ for $i = 0,1,\ldots,L-1$, and $q_2$ is not reported.

- When $(N_1, N_2) = (2,1)$, $n_1 = \{0,1\}$ and $n_2 = \{0,0\}$, and $i_{1,2}$ is not reported.

- When $(N_1, N_2) = (4,1)$ and $L=4$, $n_1 = \{0,1,2,3\}$ and $n_2 = \{0,0,0,0\}$, and $i_{1,2}$ is not reported.

- When $(N_1, N_2) = (2,2)$ and $L=4$, $n_1 = \{0,1,0,1\}$ and $n_2 = \{0,0,1,1\}$, and $i_{1,2}$ is not reported.

Table 5.2.2.2.3-1: Combinatorial coefficients $C(x,y)$

| x \ y | 1 | 2 | 3 | 4 |
|---|---|---|---|---|
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

FIG.11C

The strongest coefficient on layer $l, l = 1, \ldots, \upsilon$ is identified by $i_{1,8,l} \in \{0, 1, \ldots, 2L-1\}$.

The amplitude coefficient indicators $i_{1,4,l}$ and $i_{2,3,l}$ are $$i_{1,4,l} = \left[ k^{(1)}_{l,0}, k^{(1)}_{l,1}, \ldots, k^{(1)}_{l,2L-1} \right]$$

$$i_{2,3,l} = \left[ k^{(2)}_{l,0}, k^{(2)}_{l,1}, \ldots, k^{(2)}_{l,2L-1} \right]$$

$$k^{(1)}_{l,j} \in \{0, 1, \ldots, 7\}$$

$$k^{(2)}_{l,j} \in \{0, 1\}$$

for $l = 1, \ldots, \upsilon$. The mapping from $k^{(1)}_{l,j}$ to the amplitude coefficient $p^{(1)}_{l,j}$ is given in Table 5.2.2.2.3-2 and the mapping from $k^{(2)}_{l,j}$ to the amplitude coefficient $p^{(2)}_{l,j}$ is given in Table 5.2.2.2.3-3. The amplitude coefficients are represented by $$p^{(1)}_{l} = \left[ p^{(1)}_{l,0}, p^{(1)}_{l,1}, \ldots, p^{(1)}_{l,2L-1} \right]$$

$$p^{(2)}_{l} = \left[ p^{(2)}_{l,0}, p^{(2)}_{l,1}, \ldots, p^{(2)}_{l,2L-1} \right]$$

for $l = 1, \ldots, \upsilon$.

Table 5.2.2.2.3-2: Mapping of elements of $i_{1,4,l}$ : $k^{(1)}_{l,j}$ to $p^{(1)}_{l,j}$

| $k^{(1)}_{l,j}$ | $p^{(1)}_{l,j}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

Table 5.2.2.2.3-3: Mapping of elements of $i_{2,3,l}$ : $k^{(2)}_{l,j}$ to $p^{(2)}_{l,j}$

| $k^{(2)}_{l,j}$ | $p^{(2)}_{l,j}$ |
|---|---|
| 0 | $\sqrt{1/2}$ |
| 1 | 1 |

The phase coefficient indicators are $$i_{2,2,l} = \left[ c_{l,0}, c_{l,1}, \ldots, c_{l,2L-1} \right]$$

FIG.11D for $l = 1,...,\upsilon$.

The amplitude and phase coefficient indicators are reported as follows:

- The indicators $k_{l,1,0}^{(1)} = 7$, $k_{l,1,0}^{(2)} = 1$, and $c_{l,1,0} = 0$ $(l = 1,...,\upsilon)$. $k_{l,1,0}^{(1)}$, $k_{l,1,0}^{(2)}$, and $c_{l,1,0}$ are not reported for $l = 1,...,\upsilon$.

- The remaining $2L - 1$ elements of $i_{1,4,l}$ $(l = 1,...,\upsilon)$ are reported, where $k_{l,i}^{(1)} \in \{0,1,...,7\}$. Let $M_l$ $(l = 1,...,\upsilon)$ be the number of elements of $i_{1,4,l}$ that satisfy $k_{l,i}^{(1)} > 0$.

- The remaining $2L - 1$ elements of $i_{2,1,l}$ and $i_{2,2,l}$ $(l = 1,...,\upsilon)$ are reported as follows:

- When *subbandAmplitude* is set to 'false',

- $k_{l,i}^{(2)} = 1$ for $l = 1,...,\upsilon$, and $i = 0,1,...,2L - 1$. $i_{2,2,l}$ is not reported for $l = 1,...,\upsilon$.

- For $l = 1,...,\upsilon$, the elements of $i_{2,1,l}$ corresponding to the coefficients that satisfy $k_{l,i}^{(1)} > 0$, $i \neq i_{l,3,l}$, as determined by the reported elements of $i_{1,4,l}$, are reported, where $c_{l,i} \in \{0,1,...,N_{PSK} - 1\}$ and the remaining $2L - M_l$ elements of $i_{2,1,l}$ are not reported and are set to $c_{l,i} = 0$.

- When *subbandAmplitude* is set to 'true',

- For $l = 1,...,\upsilon$, the elements of $i_{2,2,l}$ and $i_{2,1,l}$ corresponding to the $\min(M_l, K^{(2)}) - 1$ strongest coefficients (excluding the strongest coefficient indicated by $i_{l,3,l}$), as determined by the corresponding reported elements of $i_{1,4,l}$, are reported, where $k_{l,i}^{(2)} \in \{0,1\}$ and $c_{l,i} \in \{0,1,...,N_{PSK} - 1\}$. The values of $K^{(2)}$ are given in Table 5.2.2.2.3-4. The remaining $2L - \min(M_l, K^{(2)})$ elements of $i_{2,2,l}$ are not reported and are set to $k_{l,i}^{(2)} = 1$. The elements of $i_{2,1,l}$ corresponding to the $M_l - \min(M_l, K^{(2)})$ weakest non-zero coefficients are reported, where $c_{l,i} \in \{0,1,2,3\}$. The remaining $2L - M_l$ elements of $i_{2,1,l}$ are not reported and are set to $c_{l,i} = 0$.

- When two elements, $k_{l,x}^{(1)}$ and $k_{l,y}^{(1)}$, of the reported elements of $i_{1,4,l}$ are identical ($k_{l,x}^{(1)} = k_{l,y}^{(1)}$), then element $\min(x,y)$ is prioritized to be included in the set of the $\min(M_l, K^{(2)}) - 1$ strongest coefficients for $i_{2,1,l}$ and $i_{2,2,l}$ $(l = 1,...,\upsilon)$ reporting.

**Table 5.2.2.2.3-4: Full resolution subband coefficients when *subbandAmplitude* is set to 'true'**

| $l$ | $K^{(2)}$ |
|---|---|
| 2 | 4 |
| 3 | 4 |
| 4 | 6 |

The codebooks for 1-2 layers are given in Table 5.2.2.2.3-5, where the indices $m_1^{(i)}$ and $m_2^{(i)}$ are given by $$m_1^{(i)} = O_1 n_1^{(i)} + q_1$$
$$m_2^{(i)} = O_2 n_2^{(i)} + q_2$$

FIG.11E for $i = 0, 1, \ldots, L-1$, and the quantities $\varphi_{i,j}$, $u_m$, and $v_{l,m}$ are given by $$\varphi_{i,j} = \begin{cases} e^{j2\pi c_{i,j}/N_{PSK}} & subbandAmplitude = \text{'false'} \\ e^{j2\pi c_{i,j}/N_{PSK}} & subbandAmplitude = \text{'true'}, \ \min\left(M_l, K^{(2)}\right) \text{ strongest coefficients (including } i_{1,3,l}) \text{ with } k_{l,i}^{(1)} > 0 \\ e^{j2\pi c_{i,j}/4} & subbandAmplitude = \text{'true'}, \ M_l - \min\left(M_l, K^{(2)}\right) \text{ weakest coefficients with } k_{l,i}^{(1)} > 0 \\ 1 & subbandAmplitude = \text{'true'}, \ 2L - M_l \text{ coefficients with } k_{l,i}^{(1)} = 0 \end{cases}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

Table 5.2.2.2.3-5: Codebook for 1-layer and 2-layer CSI reporting using antenna ports 3000 to 2999+$P_{CSI\text{-}RS}$

| Layers | |
|---|---|
| $v = 1$ | $W^{(1)}_{q_1,q_2,n_1,n_2,p_1^{(1)},p_2^{(1)},i_{2,5,1}} = W^1_{q_1,q_2,n_1,n_2,p_1^{(1)},p_2^{(1)},i_{2,5,1}}$ |
| $v = 2$ | $W^{(2)}_{q_1,q_2,n_1,n_2,p_1^{(1)},p_2^{(1)},i_{2,5,1},p_1^{(1)},p_2^{(1)},i_{2,5,2}} = \dfrac{1}{\sqrt{2}}\left[ W^1_{q_1,q_2,n_1,n_2,p_1^{(1)},p_2^{(1)},i_{2,5,1}} \quad W^2_{q_1,q_2,n_1,n_2,p_1^{(1)},p_2^{(1)},i_{2,5,2}} \right]$ |
| where $W^l_{q_1,q_2,n_1,n_2,p_1^{(l)},p_2^{(l)}} = \dfrac{1}{\sqrt{N_1 N_2 \displaystyle\sum_{i=0}^{2L-1}\left(p_{l,i}^{(1)}p_{l,i}^{(2)}\right)^2}} \begin{bmatrix} \displaystyle\sum_{i=0}^{L-1} v_{q_1^{(i)},q_2^{(i)}} p_{l,i}^{(1)} p_{l,i}^{(2)} \varphi_{l,i} \\ \displaystyle\sum_{i=0}^{L-1} v_{n_1^{(i)},n_2^{(i)}} p_{l,i+L}^{(1)} p_{l,i+L}^{(2)} \varphi_{l,i+L} \end{bmatrix}, \ l = 1, 2,$ | |
| and the mappings from $i_1$ to $q_1$, $q_2$, $n_1$, $n_2$, $p_1^{(1)}$, and $p_2^{(1)}$, and from $i_2$ to $i_{2,1,l}$, $i_{2,3,l}$, $p_1^{(2)}$ and $p_2^{(2)}$ are as described above, including the ranges of the constituent indices of $i_1$ and $i_2$. | |

When the UE is configured with higher layer parameter *codebookType* set to 'typeII', the bitmap parameter *typeII-RI-Restriction* forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with $v = i + 1$ layers. The bitmap parameter *n1-n2-codebookSubsetRestriction* forms the bit sequence $B = B_1 B_2$ where bit sequences $B_1$ and $B_2$ are concatenated to form $B$. To define $B_1$ and $B_2$, first define the $O_1 O_2$ vector groups $G(r_1, r_2)$ as $$G(r_1, r_2) = \left\{ v_{N_1 x_1 + r_1, N_2 x_2 + r_2} : x_1 = 0, 1, \ldots, N_1 - 1; x_2 = 0, 1, \ldots, N_2 - 1 \right\}$$

for $$r_1 \in \{0, 1, \ldots, O_1 - 1\}$$
$$r_2 \in \{0, 1, \ldots, O_2 - 1\}$$

The UE shall be configured with restrictions for 4 vector groups indicated by $\left(r_1^{(k)}, r_2^{(k)}\right)$ for $k = 0, 1, 2, 3$ and identified by the group indices

FIG.11F $$g^{(k)} = O_1 r_2^{(k)} + r_1^{(k)}$$

for $k = 0,1,...,3$, where the indices are assigned such that $g^{(k)}$ increases as $k$ increases. The remaining vector groups are not restricted.

- If $N_2 = 1$, $g^{(k)} = k$ for $k = 0,1,...,3$, and $B_1$ is empty.

- If $N_2 > 1$, $B_1 = b_1^{(0)} \cdots b_1^{(0)}$ is the binary representation of the integer $\beta_1$ where $b_1^{(0)}$ is the MSB and $b_1^{(0)}$ is the LSB. $\beta_1$ is found using:

$$\beta_1 = \sum_{k=0}^{3} C\left(O_1 O_2 - 1 - g^{(k)}, 4 - k\right),$$

where $C(x,y)$ is defined in Table 5.2.2.2.3-1. The group indices $g^{(k)}$ and indicators $\left(r_1^{(k)}, r_2^{(k)}\right)$ for $k = 0,1,2,3$ may be found from $\beta_1$ using the algorithm:

$$s_{-1} = 0$$

for $k = 0,...,3$

Find the largest $x^* \in \{3-k,...,O_1 O_2 -1-k\}$ such that $\beta_1 - s_{k-1} \geq C\left(x^*, 4-k\right)$ $$e_k = C\left(x^*, 4-k\right)$$

$$s_k = s_{k-1} + e_k$$

$$g^{(k)} = O_1 O_2 - 1 - x^*$$

$$r_1^{(k)} = g^{(k)} \bmod O_1$$

$$r_2^{(k)} = \frac{\left(g^{(k)} - r_1^{(k)}\right)}{O_1}$$

The bit sequence $B_2 = B_2^{(0)} B_2^{(1)} B_2^{(2)} B_2^{(3)}$ is the concatenation of the bit sequences $B_2^{(k)}$ for $k = 0,1,...,3$, corresponding to the group indices $g^{(k)}$. The bit sequence $B_2^{(k)}$ is defined as $$B_2^{(k)} = b_2^{(k,2N_1 N_2 -1)} \cdots b_2^{(k,0)}$$

Bits $b_2^{(k,2(N_2 x_1 + x_2)+1)} b_2^{(k,2(N_2 x_1 + x_2))}$ indicate the maximum allowed amplitude coefficient $p_{l,i}^{(1)}$ for the vector in group $g^{(k)}$ indexed by $x_1, x_2$, where the maximum amplitude coefficients are given in Table 5.2.2.2.3-6. A UE that does not report parameter *amplitudeSubsetRestriction* = 'supported' in its capability signaling is not expected to be configured with $b_2^{(k,2(N_2 x_1 + x_2)+1)} b_2^{(k,2(N_2 x_1 + x_2))}$ = 01 or 10.

Table 5.2.2.2.3-6: Maximum allowed amplitude coefficients for restricted vectors

| Bits $b_2^{(k,2(N_2 x_1 + x_2)+1)} b_2^{(k,2(N_2 x_1 + x_2))}$ | Maximum Amplitude Coefficient $p_{l,i}^{(1)}$ |
|---|---|
| 00 | 0 |
| 01 | $\sqrt{1/4}$ |

FIG.11G

| 10 | $\sqrt{3/2}$ |
|----|----|
| 11 | 1 |

5.2.2.2.4     Type II Port Selection Codebook

For 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and the UE configured with higher layer parameter *codebookType* set to 'typeII-PortSelection'

- The number of CSI-RS ports is given by $P_{CSI\text{-}RS} \in \{4, 8, 12, 16, 24, 32\}$ as configured by higher layer parameter *nrofPorts*.

- The value of $L$ is configured with the higher layer parameter *numberOfBeams*, where $L = 2$ when $P_{CSI\text{-}RS} = 4$ and $L \in \{2, 3, 4\}$ when $P_{CSI\text{-}RS} > 4$.

- The value of $d$ is configured with the higher layer parameter *portSelectionSamplingSize*, where $d \in \{1, 2, 3, 4\}$ and $d \leq \min\left(\frac{P_{CSI\text{-}RS}}{2}, L\right)$.

- The value of $N_{PSK}$ is configured with the higher layer parameter *phaseAlphabetSize*, where $N_{PSK} \in \{4, 8\}$.

- The UE is configured with the higher layer parameter *subbandAmplitude* set to 'true' or 'false'.

- The UE shall not report RI > 2.

The UE is also configured with the higher layer parameter *typeII-PortSelectionRI-Restriction*. The bitmap parameter *typeII-PortSelectionRI-Restriction* forms the bit sequence $r_1, r_0$ where $r_0$ is the LSB and $r_1$ is the MSB. When $r_i$ is zero, $i \in \{0, 1\}$, PMI and RI reporting are not allowed to correspond to any precoder associated with $v = i + 1$ layers.

When $v \leq 2$, where $v$ is the associated RI value, each PMI value corresponds to the codebook indices $i_1$ and $i_2$ where $$i_1 = \begin{cases} \begin{bmatrix} i_{1,1} & i_{1,3,1} & i_{1,4,1} \end{bmatrix} & v = 1 \\ \begin{bmatrix} i_{1,1} & i_{1,3,1} & i_{1,4,1} & i_{1,3,2} & i_{1,4,2} \end{bmatrix} & v = 2 \end{cases}$$

$$i_2 = \begin{cases} \begin{bmatrix} i_{2,1,1} \end{bmatrix} & subbandAmplitude = \text{'false'}, v = 1 \\ \begin{bmatrix} i_{2,1,1} & i_{2,1,2} \end{bmatrix} & subbandAmplitude = \text{'false'}, v = 2 \\ \begin{bmatrix} i_{2,1,1} & i_{2,2,1} \end{bmatrix} & subbandAmplitude = \text{'true'}, v = 1 \\ \begin{bmatrix} i_{2,1,1} & i_{2,2,1} & i_{2,1,2} & i_{2,2,2} \end{bmatrix} & subbandAmplitude = \text{'true'}, v = 2 \end{cases}$$

The $L$ antenna ports per polarization are selected by the index $i_{1,1}$, where $$i_{1,1} \in \left\{0, 1, ..., \left\lceil \frac{P_{CSI\text{-}RS}}{2d} \right\rceil - 1\right\}.$$

The strongest coefficient on layer $l, l = 1, ..., v$ is identified by $i_{1,3,l} \in \{0, 1, ..., 2L - 1\}$.

The amplitude coefficient indicators $i_{1,4,l}$ and $i_{2,2,l}$ are

FIG.11H $$i_{1,4,l} = \left[ k_{l,0}^{(1)}, k_{l,1}^{(1)}, \ldots, k_{l,2L-1}^{(1)} \right]$$

$$i_{2,2,l} = \left[ k_{l,0}^{(2)}, k_{l,1}^{(2)}, \ldots, k_{l,2L-1}^{(2)} \right]$$

$$k_{l,j}^{(1)} \in \{0,1,\ldots,7\}$$

$$k_{l,j}^{(2)} \in \{0,1\}$$

for $l = 1, \ldots, \upsilon$. The mapping from $k_{l,j}^{(1)}$ to the amplitude coefficient $p_{l,j}^{(1)}$ is given in Table 5.2.2.2.3-2 and the mapping from $k_{l,j}^{(2)}$ to the amplitude coefficient $p_{l,j}^{(2)}$ is given in Table 5.2.2.2.3-3. The amplitude coefficients are represented by $$p_l^{(1)} = \left[ p_{l,0}^{(1)}, p_{l,1}^{(1)}, \ldots, p_{l,2L-1}^{(1)} \right]$$

$$p_l^{(2)} = \left[ p_{l,0}^{(2)}, p_{l,1}^{(2)}, \ldots, p_{l,2L-1}^{(2)} \right]$$

for $l = 1, \ldots, \upsilon$.

The phase coefficient indicators are $$i_{2,1,l} = \left[ c_{l,0}, c_{l,1}, \ldots, c_{l,2L-1} \right]$$

for $l = 1, \ldots, \upsilon$.

The amplitude and phase coefficient indicators are reported as follows:

- The indicators $k_{l,i_{1,3,l}}^{(1)} = 7$, $k_{l,i_{1,3,l}}^{(2)} = 1$, and $c_{l,i_{1,3,l}} = 0$ $(l = 1, \ldots, \upsilon)$. $k_{l,i_{1,3,l}}^{(1)}$, $k_{l,i_{1,3,l}}^{(2)}$, and $c_{l,i_{1,3,l}}$ are not reported for $l = 1, \ldots, \upsilon$.

- The remaining $2L-1$ elements of $i_{1,4,l}$ $(l = 1, \ldots, \upsilon)$ are reported, where $k_{l,j}^{(1)} \in \{0,1,\ldots,7\}$. Let $M_l$ $(l = 1, \ldots, \upsilon)$ be the number of elements of $i_{1,4,l}$ that satisfy $k_{l,j}^{(1)} > 0$.

- The remaining $2L-1$ elements of $i_{2,1,l}$ and $i_{2,2,l}$ $(l = 1, \ldots, \upsilon)$ are reported as follows:

- When *subbandAmplitude* is set to 'false',

- $k_{l,j}^{(2)} = 1$ for $l = 1, \ldots, \upsilon$, and $j = 0, 1, \ldots, 2L-1$. $i_{2,2,l}$ is not reported for $l = 1, \ldots, \upsilon$.

- For $l = 1, \ldots, \upsilon$, the $M_l - 1$ elements of $i_{2,1,l}$ corresponding to the coefficients that satisfy $k_{l,j}^{(1)} > 0$, $j \neq i_{1,3,l}$, as determined by the reported elements of $i_{1,4,l}$, are reported, where $c_{l,j} \in \{0,1,\ldots,N_{PSK}-1\}$ and the remaining $2L - M_l$ elements of $i_{2,1,l}$ are not reported and are set to $c_{l,j} = 0$.

- When *subbandAmplitude* is set to 'true',

- For $l = 1, \ldots, \upsilon$, the elements of $i_{2,2,l}$ and $i_{2,1,l}$ corresponding to the $\min(M_l, K^{(2)}) - 1$ strongest coefficients (excluding the strongest coefficient indicated by $i_{1,3,l}$), as determined by the corresponding reported elements of $i_{1,4,l}$, are reported, where $k_{l,j}^{(2)} \in \{0,1\}$ and $c_{l,j} \in \{0,1,\ldots,N_{PSK}-1\}$. The values of $K^{(2)}$ are given in Table 5.2.2.2.3-4. The remaining $2L - \min(M_l, K^{(2)})$ elements of $i_{2,2,l}$ are not reported and are set to $k_{l,j}^{(2)} = 1$. The elements of $i_{2,1,l}$ corresponding to the $M_l - \min(M_l, K^{(2)})$ weakest

FIG.11I non-zero coefficients are reported, where $c_{l,i} \in \{0,1,2,3\}$. The remaining $2L - M_l$ elements of $i_{2,1,l}$ are not reported and are set to $c_{l,i} = 0$.

- When two elements, $k_{l,x}^{(0)}$ and $k_{l,y}^{(0)}$, of the reported elements of $i_{1,3,l}$ are identical ($k_{l,x}^{(0)} = k_{l,y}^{(0)}$), then element $\min(x,y)$ is prioritized to be included in the set of the $\min(M_l, K^{(2)}) - 1$ strongest coefficients for $i_{2,1,l}$ and $i_{2,2,l}$ ($l = 1,...,\upsilon$) reporting.

The codebooks for 1-2 layers are given in Table 5.2.2.2.4-1, where the quantity $\varphi_{l,i}$ is given by $$
\varphi_{l,i} = 
\begin{cases}
e^{j2\pi c_{l,i}/N_{\text{PSK}}} & subbandAmplitude = \text{'false'} \\
e^{j2\pi c_{l,i}/N_{\text{PSK}}} & subbandAmplitude = \text{'true'}, \ \min(M_l, K^{(2)}) \text{ strongest coefficients (including } i_{1,3,l}) \text{ with } k_{l,i}^{(1)} > 0 \\
e^{j2\pi c_{l,i}/4} & subbandAmplitude = \text{'true'}, \ M_l - \min(M_l, K^{(2)}) \text{ weakest coefficients with } k_{l,i}^{(1)} > 0 \\
1 & subbandAmplitude = \text{'true'}, \ 2L - M_l \text{ coefficients with } k_{l,i}^{(1)} = 0
\end{cases}
$$

and $v_m$ is a $P_{\text{CSI-RS}}/2$-element column vector containing a value of 1 in element ($m \bmod P_{\text{CSI-RS}}/2$) and zeros elsewhere (where the first element is element 0).

Table 5.2.2.2.4-1: Codebook for 1-layer and 2-layer CSI reporting using antenna ports 3000 to 2999+$P_{\text{CSI-RS}}$

| Layers | |
|---|---|
| $\upsilon = 1$ | $W_{i_1,i_2,p_1^{(0)},p_2^{(0)},c_{l,i}}^{(1)} = W_{i_1,i_2,p_1^{(0)},p_2^{(0)},c_{l,i}}^{1}$ |
| $\upsilon = 2$ | $W_{i_1,i_2,p_1^{(0)},p_2^{(0)},c_{l,i},p_1^{(2)},p_2^{(2)},c_{l,i}}^{(2)} = \dfrac{1}{\sqrt{2}}\left[ W_{i_1,i_2,p_1^{(0)},p_2^{(0)},c_{l,i}}^{1} \quad W_{i_1,i_2,p_1^{(2)},p_2^{(2)},c_{l,i}}^{2} \right]$ |

$$
\text{where } W_{i_1,i_2,p_1^{(0)},p_2^{(0)},c_{l,i}}^{l} = \frac{1}{\sqrt{\sum_{i=0}^{2L-1}\left(p_{l,i}^{(1)}p_{l,i}^{(2)}\right)^2}}\left[\begin{array}{c}\sum_{i=0}^{L-1} v_{i_{1,3,l}(i)} p_{l,i}^{(1)} p_{l,i}^{(2)} \varphi_{l,i} \\ \sum_{i=0}^{L-1} v_{i_{1,3,l}(i)} p_{l,i}^{(1)} p_{l,i}^{(2)} \varphi_{l,i+L}\end{array}\right], \ l = 1,2,
$$

and the mappings from $i_1$ to $i_{1,3,l}$, $p_1^{(1)}$, and $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$.

5.2.2.2.5     Enhanced Type II Codebook

For 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and UE configured with higher layer parameter *codebookType* set to 'typeII-r16'

- The values of $N_1$ and $N_2$ are configured with the higher layer parameter *n1-n2-codebookSubsetRestriction-r16*. The supported configurations of $(N_1, N_2)$ for a given number of CSI-RS ports and the corresponding values of $(O_1, O_2)$ are given in Table 5.2.2.2.1-2. The number of CSI-RS ports, $P_{\text{CSI-RS}}$, is $2N_1N_2$.

- The values of $L$, $\beta$ and $p_\upsilon$ are determined by the higher layer parameter *paramCombination-r16*, where the mapping is given in Table 5.2.2.2.5-1.

- The UE is not expected to be configured with *paramCombination-r16* equal to

- 3, 4, 5, 6, 7, or 8 when $P_{\text{CSI-RS}} = 4$,

- 7 or 8 when $P_{\text{CSI-RS}} < 32$

FIG.11J

- 7 or 8 when higher layer parameter *typeII-RI-Restriction-r16* is configured with $r_i = 1$ for any $i > 1$.

- 7 or 8 when $R = 2$.

- The parameter $R$ is configured with the higher-layer parameter *numberOfPMISubbandsPerCQISubband*. This parameter controls the total number of precoding matrices $N_3$ indicated by the PMI as a function of the number of subbands in *csi-ReportingBand*, the subband size configured by the higher-level parameter *subbandSize* and of the total number of PRBs in the bandwidth part according to Table 5.2.1.4-2, as follows:

- When $R = 1$:

- One precoding matrix is indicated by the PMI for each subband in *csi-ReportingBand*.

- When $R = 2$:

- For each subband in *csi-ReportingBand* that is not the first or last subband of a BWP, two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

- For each subband in *csi-ReportingBand* that is the first or last subband of a BWP

- If $(N_{BWP,i}^{start} \bmod N_{PRB}^{SB}) \geq \frac{N_{PRB}^{SB}}{2}$, one precoding matrix is indicated by the PMI corresponding to the first subband. If $(N_{BWP,i}^{start} \bmod N_{PRB}^{SB}) < \frac{N_{PRB}^{SB}}{2}$, two precoding matrices are indicated by the PMI corresponding to the first subband: the first precoding matrix corresponds to the first $\frac{N_{PRB}^{SB}}{2} - (N_{BWP,i}^{start} \bmod N_{PRB}^{SB})$ PRBs of the first subband and the second precoding matrix corresponds to the last $\frac{N_{PRB}^{SB}}{2}$ PRBs of the first subband.

- If $(N_{BWP,i}^{start} + N_{BWP,i}^{size}) \bmod N_{PRB}^{SB} \leq \frac{N_{PRB}^{SB}}{2}$, one precoding matrix is indicated by the PMI corresponding to the last subband. If $(N_{BWP,i}^{start} + N_{BWP,i}^{size}) \bmod N_{PRB}^{SB} > \frac{N_{PRB}^{SB}}{2}$, two precoding matrices are indicated by the PMI corresponding to the last subband: the first precoding matrix corresponds to the first $\frac{N_{PRB}^{SB}}{2}$ PRBs of the last subband and the second precoding matrix corresponds to the last $(N_{BWP,i}^{start} + N_{BWP,i}^{size}) \bmod N_{PRB}^{SB} - \frac{N_{PRB}^{SB}}{2}$ PRBs of the last subband.

Table 5.2.2.2.5-1: Codebook parameter configurations for $L$, $\beta$ and $p_v$

| paramCombination-r16 | $L$ | $p_v$ | | $\beta$ |
|---|---|---|---|---|
| | | $v \in \{1,2\}$ | $v \in \{3,4\}$ | |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | - | 1/2 |
| 8 | 6 | 1/4 | - | 3/4 |

- The UE shall report the RI value $v$ according to the configured higher layer parameter *typeII-RI-Restriction-r16*. The UE shall not report $v > 4$.

The PMI value corresponds to the codebook indices of $i_1$ and $i_2$ where

FIG.11K $$i_1 = \begin{cases} [i_{1,1} \quad i_{1,2} \quad i_{1,5} \quad i_{1,6,1} \quad i_{1,7,1} \quad i_{1,8,1}] & v = 1 \\ [i_{1,1} \quad i_{1,2} \quad i_{1,5} \quad i_{1,6,1} \quad i_{1,7,1} \quad i_{1,8,1} \quad i_{1,6,2} \quad i_{1,7,2} \quad i_{1,8,2}] & v = 2 \\ [i_{1,1} \quad i_{1,2} \quad i_{1,5} \quad i_{1,6,1} \quad i_{1,7,1} \quad i_{1,8,1} \quad i_{1,6,2} \quad i_{1,7,2} \quad i_{1,8,2} \quad i_{1,6,3} \quad i_{1,7,3} \quad i_{1,8,3}] & v = 3 \\ [i_{1,1} \quad i_{1,2} \quad i_{1,5} \quad i_{1,6,1} \quad i_{1,7,1} \quad i_{1,8,1} \quad i_{1,6,2} \quad i_{1,7,2} \quad i_{1,8,2} \quad i_{1,6,3} \quad i_{1,7,3} \quad i_{1,8,3} \quad i_{1,6,4} \quad i_{1,7,4} \quad i_{1,8,4}] & v = 4 \end{cases}$$

$$i_2 = \begin{cases} [i_{2,3,1} \quad i_{2,4,1} \quad i_{2,5,1}] & v = 1 \\ [i_{2,3,1} \quad i_{2,4,1} \quad i_{2,5,1} \quad i_{2,3,2} \quad i_{2,4,2} \quad i_{2,5,2}] & v = 2 \\ [i_{2,3,1} \quad i_{2,4,1} \quad i_{2,5,1} \quad i_{2,3,2} \quad i_{2,4,2} \quad i_{2,5,2} \quad i_{2,3,3} \quad i_{2,4,3} \quad i_{2,5,3}] & v = 3 \\ [i_{2,3,1} \quad i_{2,4,1} \quad i_{2,5,1} \quad i_{2,3,2} \quad i_{2,4,2} \quad i_{2,5,2} \quad i_{2,3,3} \quad i_{2,4,3} \quad i_{2,5,3} \quad i_{2,3,4} \quad i_{2,4,4} \quad i_{2,5,4}] & v = 4 \end{cases}$$

The precoding matrices indicated by the PMI are determined from $L + M_v$ vectors.

$L$ vectors, $v_{m_1^{(i)},m_2^{(i)}}, i = 0,1, \dots, L-1$, are indentified by the indices $q_1, q_2, n_1, n_2$, indicated by $i_{1,1}, i_{1,2}$, obtained as in 5.2.2.2.3, where the values of $C(x,y)$ are given in Table 5.2.2.2.5-4.

$M_v = \left\lceil p_v \frac{N_3}{R} \right\rceil$ vectors, $\left[ y_{0,f}^{(f)}, y_{1,f}^{(f)}, \dots, y_{N_3-1,f}^{(f)} \right]^T$, $f = 0,1, \dots, M_v - 1$, are identified by $M_{initial}$ (for $N_3 > 19$) and $n_{3,l}$ $(l = 1, \dots, v)$ where $$M_{initial} \in \{-2M_v + 1, -2M_v + 2, \dots, 0\}$$

$$n_{3,l} = \left[ n_{3,l}^{(0)}, \dots, n_{3,l}^{(M_v-1)} \right]$$

$$n_{3,l}^{(f)} \in \{0,1, \dots, N_3 - 1\}$$

which are indicated by means of the indices $i_{1,5}$ (for $N_3 > 19$) and $i_{1,6,l}$ $(l = 1, \dots, v)$, where $$i_{1,5} \in \{0,1, \dots, 2M_v - 1\}$$

$$i_{1,6,l} \in \begin{cases} \left\{ 0,1, \dots, \binom{N_3 - 1}{M_v - 1} - 1 \right\} & N_3 \leq 19 \\ \left\{ 0,1, \dots, \binom{2M_v - 1}{M_v - 1} - 1 \right\} & N_3 > 19 \end{cases}$$

The amplitude coefficient indicators $i_{2,3,l}$ and $i_{2,4,l}$ are $$i_{2,3,l} = \left[ k_{l,0}^{(1)} \quad k_{l,1}^{(1)} \right]$$

$$i_{2,4,l} = \left[ k_{l,0}^{(2)} \dots k_{l,M_v-1}^{(2)} \right]$$

$$k_{l,f}^{(2)} = \left[ k_{l,0,f}^{(2)} \dots k_{l,2L-1,f}^{(2)} \right]$$

$$k_{l,p}^{(1)} \in \{1, \dots, 15\}$$

$$k_{l,i,f}^{(2)} \in \{0, \dots, 7\}$$

for $l = 1, \dots, v$.

The phase coefficient indicator $i_{2,5,l}$ is

- $$i_{2,5,l} = \left[ c_{l,0} \dots c_{l,M_v-1} \right]$$

- $$c_{l,f} = \left[ c_{l,0,f} \dots c_{l,2L-1,f} \right]$$

- $$c_{l,i,f} \in \{0, \dots, 15\}$$

for $l = 1, \dots, v$.

FIG.11L

Let $K_0 = \lceil \beta 2L M_v \rceil$. The bitmap whose nonzero bits identify which coefficients in $i_{2,4,l}$ and $i_{2,5,l}$ are reported, is indicated by $i_{1,7,l}$ $$i_{1,7,l} = \left[ k_{l,0}^{(3)} \dots k_{l,M_v-1}^{(3)} \right]$$

$$k_{l,f}^{(3)} = \left[ k_{l,0,f}^{(3)} \dots k_{l,2L-1,f}^{(3)} \right]$$

$$k_{l,i,f}^{(3)} \in \{0,1\}$$

for $l = 1, \dots, v$, such that $K_l^{NZ} = \sum_{i=0}^{2L-1} \sum_{f=0}^{M_v-1} k_{l,i,f}^{(3)} \leq K_0$ is the number of nonzero coefficients for layer $l = 1, \dots, v$ and $K^{NZ} = \sum_{l=1}^{v} K_l^{NZ} \leq 2K_0$ is the total number of nonzero coefficients.

The indices of $i_{2,4,l}$, $i_{2,5,l}$ and $i_{1,7,l}$ are associated to the $M_v$ codebook indices in $n_{3,l}$.

The mapping from $k_{l,p}^{(1)}$ to the amplitude coefficient $p_{l,p}^{(1)}$ is given in Table 5.2.2.2.5-2 and the mapping from $k_{l,i,f}^{(2)}$ to the amplitude coefficient $p_{l,i,f}^{(2)}$ is given in Table 5.2.2.2.5-3. The amplitude coefficients are represented by $$p_l^{(1)} = \left[ p_{l,0}^{(1)} \quad p_{l,1}^{(1)} \right]$$

$$p_l^{(2)} = \left[ p_{l,0}^{(2)} \dots p_{l,M_v-1}^{(2)} \right]$$

$$p_{l,f}^{(2)} = \left[ p_{l,0,f}^{(2)} \dots p_{l,2L-1,f}^{(2)} \right]$$

for $l = 1, \dots, v$.

Let $f_l^* \in \{0,1,\dots,M_v-1\}$ be the index of $i_{2,3,l}$ and $i_l^* \in \{0,1,\dots,2L-1\}$ be the index of $k_{l,i_l^*}^{(2)}$ which identify the strongest coefficient of layer $l$, i.e., the element $k_{l,i_l^*,f_l^*}^{(2)}$ of $i_{2,4,l}$, for $i = 0,1,\dots,2L-1$ and $f = 0,1,\dots,M_v-1$. The codebook indices of $n_{3,l}$ are remapped with respect to $n_{3,l}^{(f_l^*)}$ as $n_{3,l}^{(f)} = \left( n_{3,l}^{(f)} - n_{3,l}^{(f_l^*)} \right) \bmod N_3$, such that $n_{3,l}^{(f_l^*)} = 0$, after remapping. The index $f$ is remapped with respect to $f_l^*$ as $f = (f - f_l^*) \bmod M_v$, such that the index of the strongest coefficient is $f_l^* = 0$ ($l = 1,\dots,v$), after remapping. The indices of $i_{2,4,l}$, $i_{2,5,l}$ and $i_{1,7,l}$ indicate amplitude coefficients, phase coefficients and bitmap after remapping.

The strongest coefficient of layer $l$ is identified by $i_{1,8,l} \in \{0,1,\dots,2L-1\}$, which is obtained as follows $$i_{1,8,l} = \begin{cases} \sum_{i=0}^{i_l^*} k_{1,i,0}^{(3)} - 1 & v = 1 \\ i_l^* & 1 < v \leq 4 \end{cases}$$

for $l = 1,\dots,v$.

Table 5.2.2.2.5-2: Mapping of elements of $i_{2,3,l}$: $k_{l,p}^{(1)}$ to $p_{l,p}^{(1)}$

| $k_{l,p}^{(1)}$ | $p_{l,p}^{(1)}$ | $k_{l,p}^{(1)}$ | $p_{l,p}^{(1)}$ | $k_{l,p}^{(1)}$ | $p_{l,p}^{(1)}$ | $k_{l,p}^{(1)}$ | $p_{l,p}^{(1)}$ |
|---|---|---|---|---|---|---|---|
| 0 | Reserved | 4 | $\left(\frac{1}{2048}\right)^{1/4}$ | 8 | $\left(\frac{1}{128}\right)^{1/4}$ | 12 | $\left(\frac{1}{8}\right)^{1/4}$ |
| 1 | $\frac{1}{\sqrt{128}}$ | 5 | $\frac{1}{2\sqrt{8}}$ | 9 | $\frac{1}{\sqrt{8}}$ | 13 | $\frac{1}{\sqrt{2}}$ |
| 2 | $\left(\frac{1}{8192}\right)^{1/4}$ | 6 | $\left(\frac{1}{512}\right)^{1/4}$ | 10 | $\left(\frac{1}{32}\right)^{1/4}$ | 14 | $\left(\frac{1}{2}\right)^{1/4}$ |

FIG.11M

| 3 | $\frac{1}{8}$ | | 7 | $\frac{1}{4}$ | | 11 | $\frac{1}{2}$ | | 15 | 1 |
|---|---|---|---|---|---|---|---|---|---|---|

The amplitude and phase coefficient indicators are reported as follows:

- $k^{(1)}_{i\left(\lfloor\frac{l}{2}\rfloor\right)} = 15$, $k^{(2)}_{l,i^*_l,0} = 7$, $k^{(3)}_{l,i^*_l,0} = 1$ and $c_{l,i^*_l,0} = 0$   ($l = 1, ..., \upsilon$). The indicators $k^{(1)}_{i\left(\lfloor\frac{l}{2}\rfloor\right)}$, $k^{(3)}_{l,i^*_l,0}$ and $c_{l,i^*_l,0}$ are not reported for $l = 1, ..., \upsilon$.

- The indicator $k^{(1)}_{i\left(\lfloor\frac{l}{2}\rfloor+1\right)\bmod 2}$ is reported for $l = 1, ..., \upsilon$.

- The $K^{NZ} - \upsilon$ indicators $k^{(2)}_{l,i,f}$ for which $i \neq i^*_l, f \neq 0$ and $k^{(3)}_{l,i,f} = 1$ are reported.

- The $K^{NZ} - \upsilon$ indicators $c_{l,i,f}$ for which $i \neq i^*_l, f \neq 0$ and $k^{(3)}_{l,i,f} = 1$ are reported.

- The remaining $2L \cdot M_\nu \cdot \nu - K^{NZ}$ indicators $k^{(2)}_{l,i,f} = 0$ are not reported and the corresponding $k^{(3)}_{l,i,f} = 0$ are reported.

- The remaining $2L \cdot M_\nu \cdot \nu - K^{NZ}$ indicators $c_{l,i,f} = 0$ are not reported and the corresponding $k^{(3)}_{l,i,f} = 0$ are reported.

Table 5.2.2.2.5-3: Mapping of elements of $i_{2,4,l}$: $k^{(2)}_{l,i,f}$ to $p^{(2)}_{l,i,f}$

| $k^{(2)}_{l,i,f}$ | $p^{(2)}_{l,i,f}$ |
|---|---|
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

The elements of $n_1$ and $n_2$ are found from $i_{1,2}$ using the algorithm described in 5.2.2.2.3, where the values of $C(x, y)$ are given in Table 5.2.2.2.5-. .

For $N_3 > 19$, $M_{initial}$ is identified by $i_{1,5}$.

FIG.11N

For all values of $N_3$, $n_{3,l}^{(0)} = 0$ for $l = 1, \ldots, v$. The nonzero elements of $n_{3,l}$, identified by $n_{3,l}^{(1)}, \ldots, n_{3,l}^{(M_v-1)}$, are found from $i_{1,6,l}$ $(l = 1, \ldots, v)$, for $N_3 \leq 19$, and from $i_{1,6,l}$ $(l = 1, \ldots, v)$ and $M_{initial}$, for $N_3 > 19$, using $C(x,y)$ as defined in 5.2.2.2.3 and the algorithm:

$s_0 = 0$ for $f = 1, \ldots, M_v - 1$

Find the largest $x^* \in \{M_v - 1 - f, \ldots, N_3 - 1 - f\}$ in Table 5.2.2.2.5-4 such that $i_{1,6,l} - s_{f-1} \geq C(x^*, M_v - f)$ $e_f = C(x^*, M_v - f)$ $s_f = s_{f-1} + e_f$ if $N_3 \leq 19$ $n_{3,l}^{(f)} = N_3 - 1 - x^*$ else $n_l^{(f)} = 2M_v - 1 - x^*$ if $n_l^{(f)} \leq M_{initial} + 2M_v - 1$ $n_{3,l}^{(f)} = n_l^{(f)}$ else $n_{3,l}^{(f)} = n_l^{(f)} + (N_3 - 2M_v)$ end if end if end if

Table 5.2.2.2.5-4: Combinatorial coefficients $C(x,y)$

| $x$ \ $y$ | 1 | 2 | 3 | 4 | 5 | 6 | 7 | 8 | 9 |
|---|---|---|---|---|---|---|---|---|---|
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 2 | 1 | 0 | 0 | 0 | 0 | 0 | 0 | 0 |
| 3 | 3 | 3 | 1 | 0 | 0 | 0 | 0 | 0 | 0 |
| 4 | 4 | 6 | 4 | 1 | 0 | 0 | 0 | 0 | 0 |
| 5 | 5 | 10 | 10 | 5 | 1 | 0 | 0 | 0 | 0 |
| 6 | 6 | 15 | 20 | 15 | 6 | 1 | 0 | 0 | 0 |
| 7 | 7 | 21 | 35 | 35 | 21 | 7 | 1 | 0 | 0 |
| 8 | 8 | 28 | 56 | 70 | 56 | 28 | 8 | 1 | 0 |
| 9 | 9 | 36 | 84 | 126 | 126 | 84 | 36 | 9 | 1 |
| 10 | 10 | 45 | 120 | 210 | 252 | 210 | 120 | 45 | 10 |
| 11 | 11 | 55 | 165 | 330 | 462 | 462 | 330 | 165 | 55 |
| 12 | 12 | 66 | 220 | 495 | 792 | 924 | 792 | 495 | 220 |
| 13 | 13 | 78 | 286 | 715 | 1287 | 1716 | 1716 | 1287 | 715 |
| 14 | 14 | 91 | 364 | 1001 | 2002 | 4004 | 3432 | 3003 | 2002 |

FIG.110

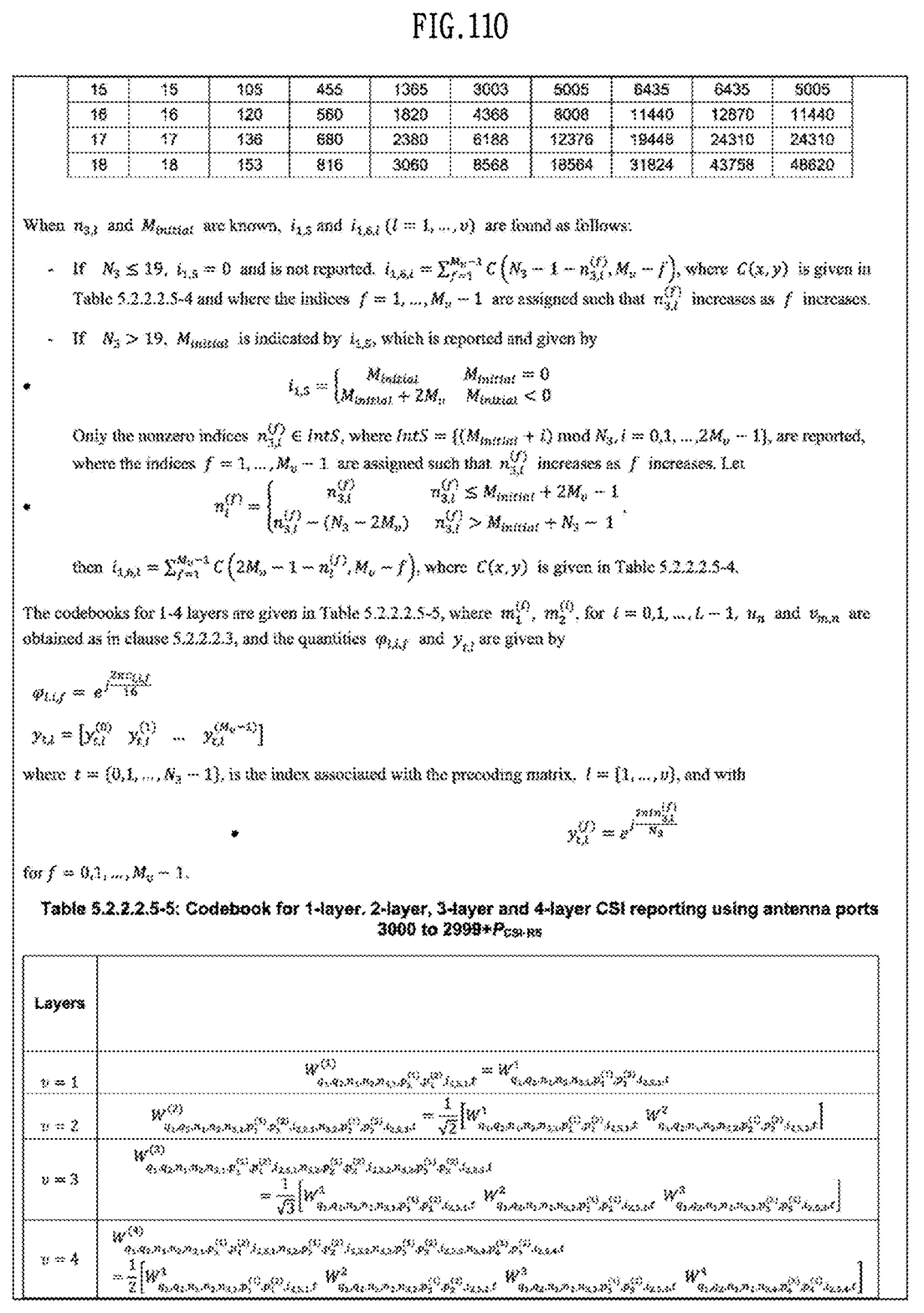

| 15 | 15 | 105 | 455 | 1365 | 3003 | 5005 | 6435 | 6435 | 5005 |
| 16 | 16 | 120 | 560 | 1820 | 4368 | 8008 | 11440 | 12870 | 11440 |
| 17 | 17 | 136 | 680 | 2380 | 6188 | 12376 | 19448 | 24310 | 24310 |
| 18 | 18 | 153 | 816 | 3060 | 8568 | 18564 | 31824 | 43758 | 48620 |

When $n_{3,l}$ and $M_{initial}$ are known, $i_{1,5}$ and $i_{1,6,l}$ $(l = 1, ..., v)$ are found as follows:

- If $N_3 \leq 19$, $i_{1,5} = 0$ and is not reported. $i_{1,6,l} = \sum_{f=1}^{M_v - 1} C\left(N_3 - 1 - n_{3,l}^{(f)}, M_v - f\right)$, where $C(x,y)$ is given in Table 5.2.2.2.5-4 and where the indices $f = 1, ..., M_v - 1$ are assigned such that $n_{3,l}^{(f)}$ increases as $f$ increases.

- If $N_3 > 19$, $M_{initial}$ is indicated by $i_{1,5}$, which is reported and given by $$i_{1,5} = \begin{cases} M_{initial} & M_{initial} = 0 \\ M_{initial} + 2M_v & M_{initial} < 0 \end{cases}$$

Only the nonzero indices $n_{3,l}^{(f)} \in IntS$, where $IntS = \{(M_{initial} + i) \bmod N_3, i = 0,1, ..., 2M_v - 1\}$, are reported, where the indices $f = 1, ..., M_v - 1$ are assigned such that $n_{3,l}^{(f)}$ increases as $f$ increases. Let $$n_l^{(f)} = \begin{cases} n_{3,l}^{(f)} & n_{3,l}^{(f)} \leq M_{initial} + 2M_v - 1 \\ n_{3,l}^{(f)} - (N_3 - 2M_v) & n_{3,l}^{(f)} > M_{initial} + N_3 - 1 \end{cases}$$

then $i_{1,6,l} = \sum_{f=1}^{M_v - 1} C\left(2M_v - 1 - n_l^{(f)}, M_v - f\right)$, where $C(x,y)$ is given in Table 5.2.2.2.5-4.

The codebooks for 1-4 layers are given in Table 5.2.2.2.5-5, where $m_1^{(l)}$, $m_2^{(l)}$, for $l = 0,1, ..., L - 1$, $u_n$ and $v_{m,n}$ are obtained as in clause 5.2.2.2.3, and the quantities $\varphi_{l,i,f}$ and $y_{t,l}$ are given by $$\varphi_{l,i,f} = e^{j \frac{2\pi c_{l,i,f}}{16}}$$

$$y_{t,l} = \left[ y_{t,l}^{(0)} \quad y_{t,l}^{(1)} \quad \cdots \quad y_{t,l}^{(M_v - 1)} \right]$$

where $t = \{0,1, ..., N_3 - 1\}$, is the index associated with the precoding matrix, $l = \{1, ..., v\}$, and with $$y_{t,l}^{(f)} = e^{j \frac{2\pi t n_{3,l}^{(f)}}{N_3}}$$

for $f = 0,1, ..., M_v - 1$.

Table 5.2.2.2.5-5: Codebook for 1-layer, 2-layer, 3-layer and 4-layer CSI reporting using antenna ports 3000 to 2999+$P_{CSI-RS}$

| Layers | |
|---|---|
| $v = 1$ | $W^{(1)}_{q_1,q_2,n_1,n_2,p_1^{(2)},p_2^{(2)},i_{1,5,l},t} = W^1_{q_1,q_2,n_1,n_2,p_1^{(2)},p_2^{(2)},i_{1,5,l},t}$ |
| $v = 2$ | $W^{(2)}_{q_1,q_2,n_1,n_2,p_1^{(2)},p_2^{(2)},i_{1,5,l},t} = \frac{1}{\sqrt{2}}\left[ W^1_{q_1,q_2,n_1,n_2,p_1^{(2)},p_2^{(2)},i_{1,5,l},t} \quad W^2_{q_1,q_2,n_1,n_2,p_1^{(2)},p_2^{(2)},i_{1,5,l},t} \right]$ |
| $v = 3$ | $W^{(3)}_{q_1,q_2,n_1,n_2,p_1^{(2)},p_2^{(2)},i_{1,5,l},t}$ $= \frac{1}{\sqrt{3}}\left[ W^1_{q_1,q_2,n_1,n_2,p_1^{(2)},p_2^{(2)},i_{1,5,l},t} \quad W^2_{q_1,q_2,n_1,n_2,p_1^{(2)},p_2^{(2)},i_{1,5,l},t} \quad W^3_{q_1,q_2,n_1,n_2,p_1^{(2)},p_2^{(2)},i_{1,5,l},t} \right]$ |
| $v = 4$ | $W^{(4)}_{q_1,q_2,n_1,n_2,p_1^{(2)},p_2^{(2)},i_{1,5,l},t}$ $= \frac{1}{2}\left[ W^1_{q_1,q_2,n_1,n_2,p_1^{(2)},p_2^{(2)},i_{1,5,l},t} \quad W^2_{q_1,q_2,n_1,n_2,p_1^{(2)},p_2^{(2)},i_{1,5,l},t} \quad W^3_{q_1,q_2,n_1,n_2,p_1^{(2)},p_2^{(2)},i_{1,5,l},t} \quad W^4_{q_1,q_2,n_1,n_2,p_1^{(2)},p_2^{(2)},i_{1,5,l},t} \right]$ |

FIG.11P

Where $W^l_{n_1,q_2,n_1,n_2,n_3,p_l^{(1)},p_l^{(2)},l,x,f} = \dfrac{1}{\sqrt{K_1 K_2 \gamma_{l,f}}} \begin{bmatrix} \sum_{i=0}^{L-1} v_{m_i^{(1)},m_i^{(2)}} p_{l,i}^{(1)} \sum_{f=0}^{M_v-1} y_{l,f}^{(f)} p_{l,i,f}^{(2)} \varphi_{l,i,f} \\ \sum_{i=0}^{L-1} v_{m_i^{(1)},m_i^{(2)}} p_{l,i}^{(1)} \sum_{f=0}^{M_v-1} y_{l,f}^{(f)} p_{l,i+L,f}^{(2)} \varphi_{l,i+L,f} \end{bmatrix}, l = 1,2,3,4.$ $$\gamma_{l,f} = \sum_{i=0}^{2L-1} \left( p_{l,\lfloor i \rfloor}^{(1)} \right)^2 \left| \sum_{f=0}^{M_v-1} y_{l,f}^{(f)} p_{l,i,f}^{(2)} \varphi_{l,i,f} \right|^2$$

and the mappings from $i_1$ to $q_1$, $q_2$, $n_1$, $n_2$, $n_{3,1}$, $n_{3,2}$, $n_{3,3}$, $n_{3,4}$, $p_1^{(1)}$, $p_2^{(1)}$, $p_3^{(1)}$ and $p_4^{(1)}$, and from $i_2$ to $i_{2,5,1}$, $i_{2,5,2}$, $i_{2,5,3}$, $i_{2,5,4}$, $p_1^{(2)}$, $p_2^{(2)}$, $p_3^{(2)}$ and $p_4^{(2)}$ are as described above, including the ranges of the constituent indices of $i_1$ and $i_2$.

For coefficients with $k_{l,i,f}^{(3)} = 0$, amplitude and phase are set to zero, i.e., $p_{l,i,f}^{(2)} = 0$ and $\varphi_{l,i,f} = 0$.

The bitmap parameter *typeII-RI-Restriction-r16* forms the bit sequence $r_3,r_2,r_1,r_0$ where $r_0$ is the LSB and $r_3$ is the MSB. When $r_i$ is zero, $i \in \{0,1,...,3\}$, PMI and RI reporting are not allowed to correspond to any precoder associated with $v = i + 1$ layers.

The bitmap parameter *n1-n2-codebookSubsetRestriction-r16* forms the bit sequence $B = B_1 B_2$ and configures the vector group indices $g^{(k)}$ as in clause 5.2.2.2.3. Bits $b_2^{(k,2(N_1 x_2 + x_1)+1)} b_2^{(k,2(N_1 x_2 + x_1))}$ indicate the maximum allowed average amplitude, $\gamma_{i+pL}$ $(p = 0,1)$, with $i \in \{0,1,...,L-1\}$, of the coefficients associated with the vector in group $g^{(k)}$ indexed by $x_1,x_2$, where the maximum amplitudes are given in Table 5.2.2.2.5-6 and the average coefficient amplitude is restricted as follows $$\sqrt{\frac{1}{\sum_{f=0}^{M_v-1} k_{(i+pL,f)}^{(3)}} \sum_{f=0}^{M_v-1} k_{l,i+pL,f}^{(3)} \left( p_{l,i}^{(1)} p_{l,i+pL,f}^{(2)} \right)^2} \leq \gamma_{i+pL}$$

for $l = 1,...,v$, and $p = 0,1$. A UE that does not report the parameter *amplitudeSubsetRestriction*='supported' in its capability signaling is not expected to be configured with $b_2^{(k,2(N_1 x_2 + x_1)+1)} b_2^{(k,2(N_1 x_2 + x_1))} = 01$ or $10$.

Table 5.2.2.2.5-6: Maximum allowed average coefficient amplitudes for restricted vectors

| Bit $b_2^{(k,2(N_1 x_2 + x_1)+1)} b_2^{(k,2(N_1 x_2 + x_1))}$ | Maximum Average Coefficient Amplitude $\gamma_{i+pL}$ |
|---|---|
| 00 | 0 |
| 01 | $\sqrt{1/4}$ |
| 10 | $\sqrt{1/2}$ |
| 11 | 1 |

5.2.2.2.6     Enhanced Type II Port Selection Codebook

For 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and the UE configured with higher layer parameter *codebookType* set to 'typeII-PortSelection-r16'

- The number of CSI-RS ports is configured as in Clause 5.2.2.2.4

- The value of $d$ is configured with the higher layer parameter *portSelectionSamplingSize-r16*, where $d \in \{1,2,3,4\}$ and $d \leq L$.

- The values $L$, $\beta$ and $p_v$ are configured as in Clause 5.2.2.2.5, where the supported configurations are given in Table 5.2.2.2.6-1.

Table 5.2.2.2.6-1: Codebook parameter configurations for $L$, $\beta$ and $p_v$

| | $L$ | $p_v$ | $\beta$ |
|---|---|---|---|
| | | | |

FIG.11Q

| paramCombination-r16 | | $v \in \{1,2\}$ | $v \in \{3,4\}$ | |
|---|---|---|---|---|
| 1 | 2 | ¼ | 1/8 | ¼ |
| 2 | 2 | ¼ | 1/8 | ½ |
| 3 | 4 | ¼ | 1/8 | ¼ |
| 4 | 4 | ¼ | 1/8 | ½ |
| 5 | 4 | ¼ | ¼ | ¾ |
| 6 | 4 | ½ | ¼ | ½ |

- The UE shall report the RI value $v$ according to the configured higher layer parameter *typeII-PortSelectionRI-Restriction-r16*. The UE shall not report $v > 4$.

- The values of $R$ is configured as in Clause 5.2.2.2.5.

The UE is also configured with the higher layer bitmap parameter *typeII-PortSelectionRI-Restriction-r16*, which forms the bit sequence $r_3, r_2, r_1, r_0$ where $r_0$ is the LSB and $r_3$ is the MSB. When $r_i$ is zero, $i \in \{0,1,...,3\}$, PMI and RI reporting are not allowed to correspond to any precoder associated with $v = i + 1$ layers.

The PMI value corresponds to the codebook indices $i_1$ and $i_2$ where $$
i_1 = \begin{cases}
[i_{1,1} \quad i_{1,5} \quad i_{1,6,1} \quad i_{1,7,1} \quad i_{1,8,1}] & v = 1 \\
[i_{1,1} \quad i_{1,5} \quad i_{1,6,1} \quad i_{1,7,1} \quad i_{1,8,1} \quad i_{1,6,2} \quad i_{1,7,2} \quad i_{1,8,2}] & v = 2 \\
[i_{1,1} \quad i_{1,5} \quad i_{1,6,1} \quad i_{1,7,1} \quad i_{1,8,1} \quad i_{1,6,2} \quad i_{1,7,2} \quad i_{1,8,2} \quad i_{1,6,3} \quad i_{1,7,3} \quad i_{1,8,3}] & v = 3 \\
[i_{1,1} \quad i_{1,5} \quad i_{1,6,1} \quad i_{1,7,1} \quad i_{1,8,1} \quad i_{1,6,2} \quad i_{1,7,2} \quad i_{1,8,2} \quad i_{1,6,3} \quad i_{1,7,3} \quad i_{1,8,3} \quad i_{1,6,4} \quad i_{1,7,4} \quad i_{1,8,4}] & v = 4
\end{cases}
$$

$$
i_2 = \begin{cases}
[i_{2,3,1} \quad i_{2,4,1} \quad i_{2,5,1}] & v = 1 \\
[i_{2,3,1} \quad i_{2,4,1} \quad i_{2,5,1} \quad i_{2,3,2} \quad i_{2,4,2} \quad i_{2,5,2}] & v = 2 \\
[i_{2,3,1} \quad i_{2,4,1} \quad i_{2,5,1} \quad i_{2,3,2} \quad i_{2,4,2} \quad i_{2,5,2} \quad i_{2,3,3} \quad i_{2,4,3} \quad i_{2,5,3}] & v = 3 \\
[i_{2,3,1} \quad i_{2,4,1} \quad i_{2,5,1} \quad i_{2,3,2} \quad i_{2,4,2} \quad i_{2,5,2} \quad i_{2,3,3} \quad i_{2,4,3} \quad i_{2,5,3} \quad i_{2,3,4} \quad i_{2,4,4} \quad i_{2,5,4}] & v = 4
\end{cases}
$$

The $2L$ antenna ports are selected by the index $i_{1,3}$ as in clause 5.2.2.2.4.

Parameters $N_3, M_v, M_{initial}$ (for $N_3 > 19$) and $K_0$ are defined as in clause 5.2.2.2.5.

For layer $l$, $l = 1,...,v$, the strongest coefficient $i_{1,8,l}$, the amplitude coefficient indicators $i_{2,3,l}$ and $i_{2,4,l}$, the phase coefficient indicator $i_{2,5,l}$ and the bitmap indicator $i_{1,7,l}$ are defined and indicated as in clause 5.2.2.2.5, where the mapping from $k_{l,f}^{(1)}$ to the amplitude coefficient $p_{l,f}^{(1)}$ is given in Table 5.2.2.2.5-2 and the mapping from $k_{l,f}^{(2)}$ to the amplitude coefficient $p_{l,f}^{(2)}$ is given in Table 5.2.2.2.5-3.

The number of nonzero coefficients for layer $l$, $K_l^{NZ}$, and the total number of nonzero coefficients $K^{NZ}$ are defined as in Clause 5.2.2.2.5.

The amplitude coefficients $p_l^{(1)}$ and $p_l^{(2)}$ ($l = 1,...,v$) are represented as in clause 5.2.2.2.5.

The amplitude and phase coefficient indicators are reported as in clause 5.2.2.2.5.

Codebook indicators $i_{1,5}$ and $i_{1,6,l}$ ($l = 1,...,v$) are found as in clause 5.2.2.2.5.

The codebooks for 1-4 layers are given in Table 5.2.2.2.6-2, where $v_m$ is a $P_{CSI-RS}/2$-element column vector containing a value of 1 in element ($m \bmod P_{CSI-RS}/2$) and zeros elsewhere (where the first element is element 0), and the quantities $\varphi_{l,i,f}$ and $y_t$ are defined as in clause 5.2.2.2.5.

FIG.11R

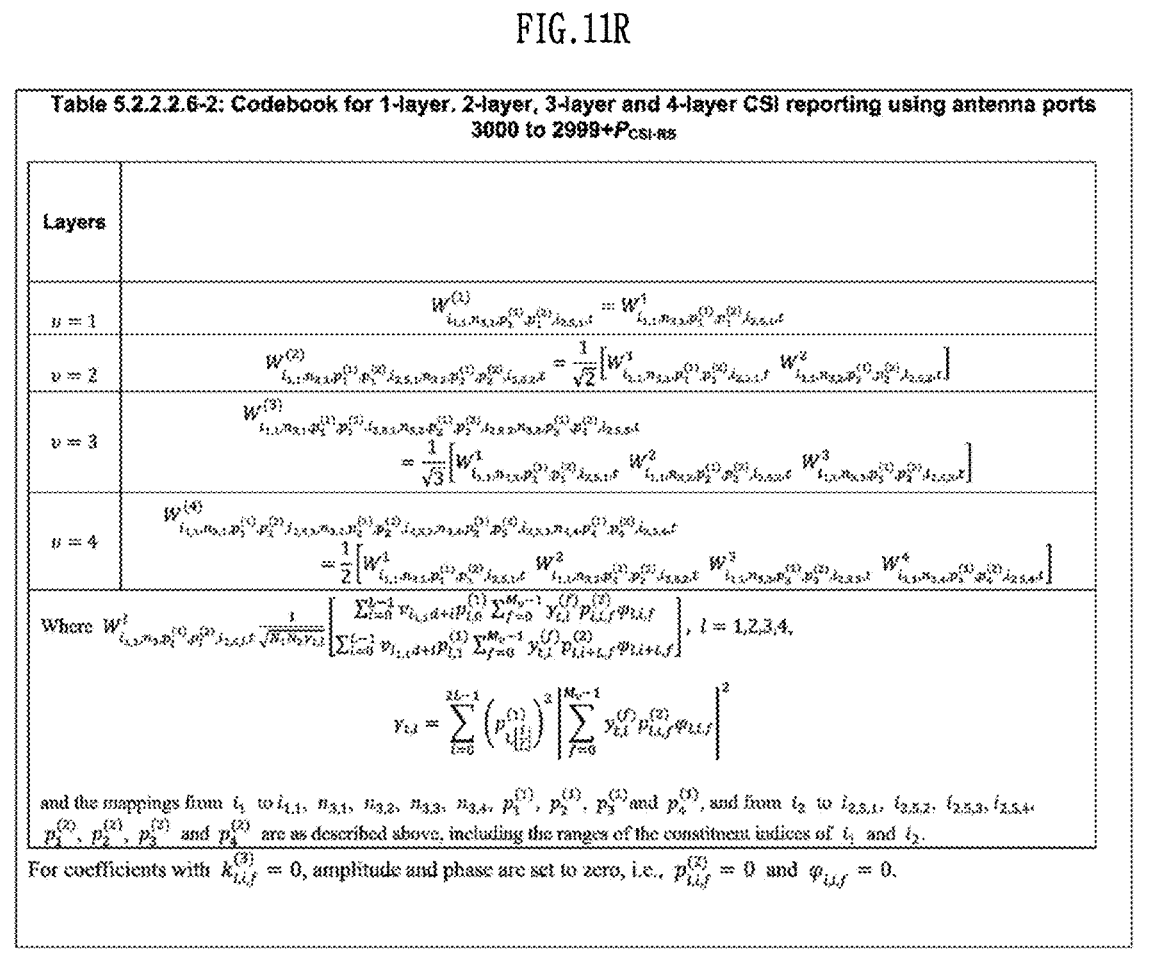

Table 5.2.2.2.6-2: Codebook for 1-layer, 2-layer, 3-layer and 4-layer CSI reporting using antenna ports 3000 to 2999+$P_{CSI\text{-}RS}$

| Layers | |
|--------|--|
| $v = 1$ | $W^{(1)}_{\ldots} = W^1_{\ldots}$ |
| $v = 2$ | $W^{(2)}_{\ldots} = \frac{1}{\sqrt{2}}\left[ W^1_{\ldots} \quad W^2_{\ldots} \right]$ |
| $v = 3$ | $W^{(3)}_{\ldots} = \frac{1}{\sqrt{3}}\left[ W^1_{\ldots} \quad W^2_{\ldots} \quad W^3_{\ldots} \right]$ |
| $v = 4$ | $W^{(4)}_{\ldots} = \frac{1}{2}\left[ W^1_{\ldots} \quad W^2_{\ldots} \quad W^3_{\ldots} \quad W^4_{\ldots} \right]$ |

Where $W^l_{\ldots} = \frac{1}{\sqrt{N_1 N_2 \gamma_{l,i}}}\left[ \begin{array}{c} \sum_{i=0}^{L-1} v_{l,i,d+iP^{(1)}_{l,0}} \sum_{f=0}^{M_v-1} y^{(f)}_{t,i} p^{(2)}_{l,i,f} \varphi_{l,i,f} \\ \sum_{i=0}^{L-1} v_{l,i,d+iP^{(1)}_{l,1}} \sum_{f=0}^{M_v-1} y^{(f)}_{t,i} p^{(2)}_{l,1+i,f} \varphi_{l,1+i,f} \end{array} \right]$, $l = 1,2,3,4$, $$\gamma_{l,i} = \sum_{i=0}^{2L-1} \left( p^{(1)}_{l,i} \right)^2 \left| \sum_{f=0}^{M_v-1} y^{(f)}_{t,i} p^{(2)}_{l,i,f} \varphi_{l,i,f} \right|^2$$

and the mappings from $i_1$ to $i_{1,1}$, $n_{3,1}$, $n_{3,2}$, $n_{3,3}$, $n_{3,4}$, $p^{(1)}_1$, $p^{(1)}_2$, $p^{(1)}_3$ and $p^{(1)}_4$, and from $i_2$ to $i_{2,5,1}$, $i_{2,5,2}$, $i_{2,5,3}$, $i_{2,5,4}$, $p^{(2)}_1$, $p^{(2)}_2$, $p^{(2)}_3$ and $p^{(2)}_4$ are as described above, including the ranges of the constituent indices of $i_1$ and $i_2$.

For coefficients with $k^{(3)}_{l,i,f} = 0$, amplitude and phase are set to zero, i.e., $p^{(3)}_{l,i,f} = 0$ and $\varphi_{l,i,f} = 0$.

METHOD AND DEVICE FOR TRANSMITTING AND RECEIVING CHANNEL STATE INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2022/012427, filed on Aug. 19, 2022, which claims the benefit of Korean Application No. 10-2021-0110505, filed on Aug. 20, 2021. The disclosures of the prior applications are incorporated by reference in their entirety.

TECHNICAL FIELD

The present disclosure relates to a wireless communication system, and in more detail, relates to a method and an apparatus of transmitting and receiving channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving channel state information.

In addition, an additional technical object of the present disclosure is to provide a method and an apparatus of for reporting an amplitude coefficient for a specific spatial domain (SD) basis-frequency domain (FD) basis combination when bitmap reporting for a non-zero coefficient indication is omitted.

The technical objects to be achieved by the present disclosure are not limited to the above-described technical objects, and other technical objects which are not described herein will be clearly understood by those skilled in the pertinent art from the following description.

A method of transmitting channel state information (CSI) in a wireless communication system according to an aspect of the present disclosure may include: receiving, from a base station, configuration information related to CSI; receiving, from the base station, a CSI-reference signal (CSI-RS) on one or more CSI resources; and transmitting, to the base station, the CSI based on the configuration information. The CSI may include a precoding matrix indicator (PMI) corresponding to indices of a codebook for indicating a precoding matrix, the PMI may include one or more amplitude coefficient indicators for indicating an amplitude coefficient and/or one or more phase coefficient indicators for indicating a phase coefficient, and based on a bitmap for identifying which coefficients are reported by the one or more amplitude coefficient indicators and the one or more phase coefficient indicators being not reported in the PMI, although a mapping in which a non-zero amplitude coefficient is indicated according to each of values of the amplitude coefficient indicators is predefined, an amplitude coefficient for a specific value of the amplitude coefficient indicator may be considered to be zero.

A method of receiving channel state information (CSI) according to an additional aspect of the present disclosure may include: transmitting, to a user equipment (UE), configuration information related to CSI; transmitting, to the UE, a CSI-reference signal (CSI-RS) on one or more CSI resources; and receiving, from the UE, the CSI based on the configuration information. The CSI may include a precoding matrix indicator (PMI) corresponding to indices of a codebook for indicating a precoding matrix, the PMI may include one or more amplitude coefficient indicators for indicating an amplitude coefficient and/or one or more phase coefficient indicators for indicating a phase coefficient, and based on a bitmap for identifying which coefficients are reported by the one or more amplitude coefficient indicators and the one or more phase coefficient indicators being not reported in the PMI, although a mapping in which a non-zero amplitude coefficient is indicated according to each of values of the amplitude coefficient indicators is predefined, an amplitude coefficient for a specific value of the amplitude coefficient indicator may be considered to be zero.

According to an embodiment of the present disclosure, the overhead of channel state information can be reduced by omitting bitmap reporting for a non-zero coefficient indication.

In addition, according to an embodiment of the present disclosure, when bitmap reporting for a non-zero coefficient indication is omitted, performance degradation can be prevented by preventing unnecessary reporting of amplitude coefficients for SD basis-FD basis combinations.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

3

Figure 5:
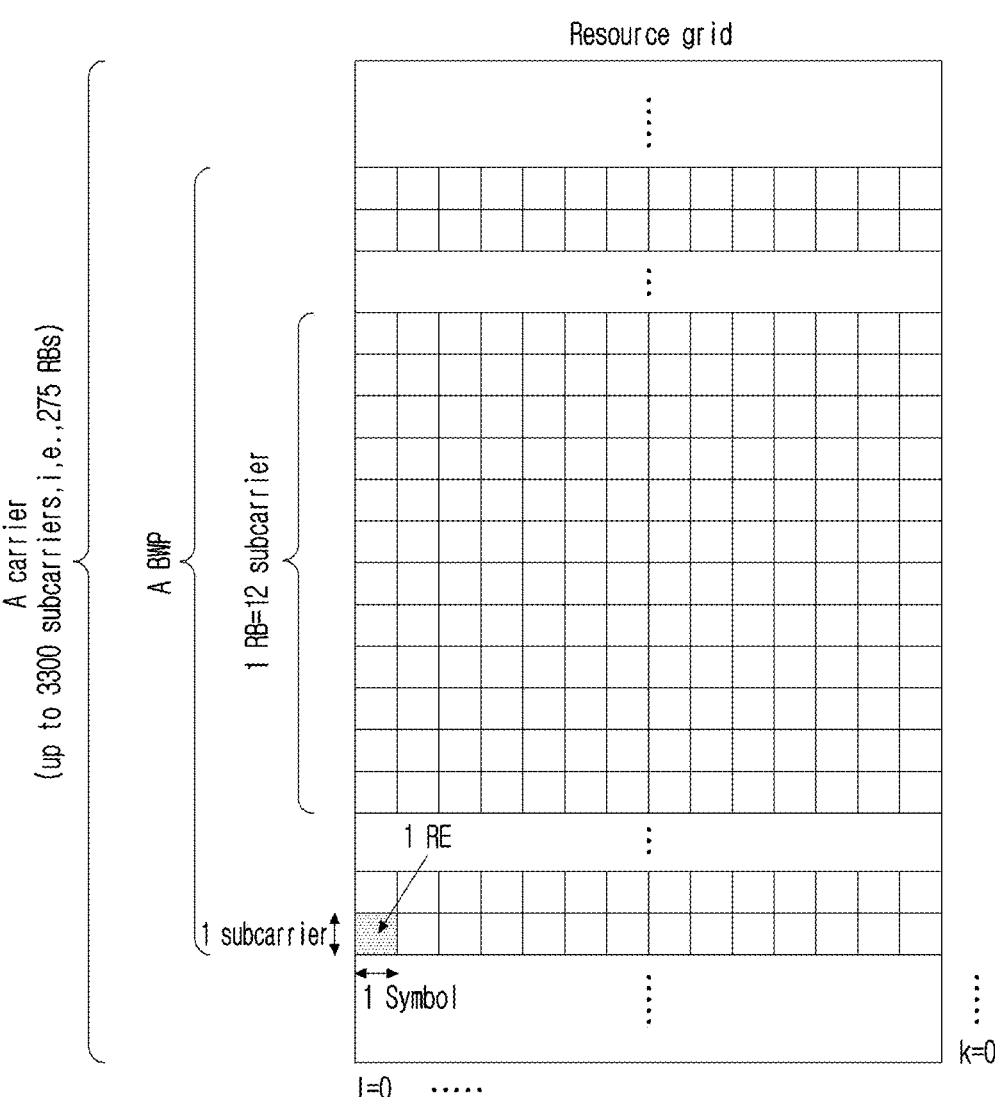

FIG. 5 illustrates a slot structure in a wireless communication system to which the present disclosure may be applied.

Figure 6:
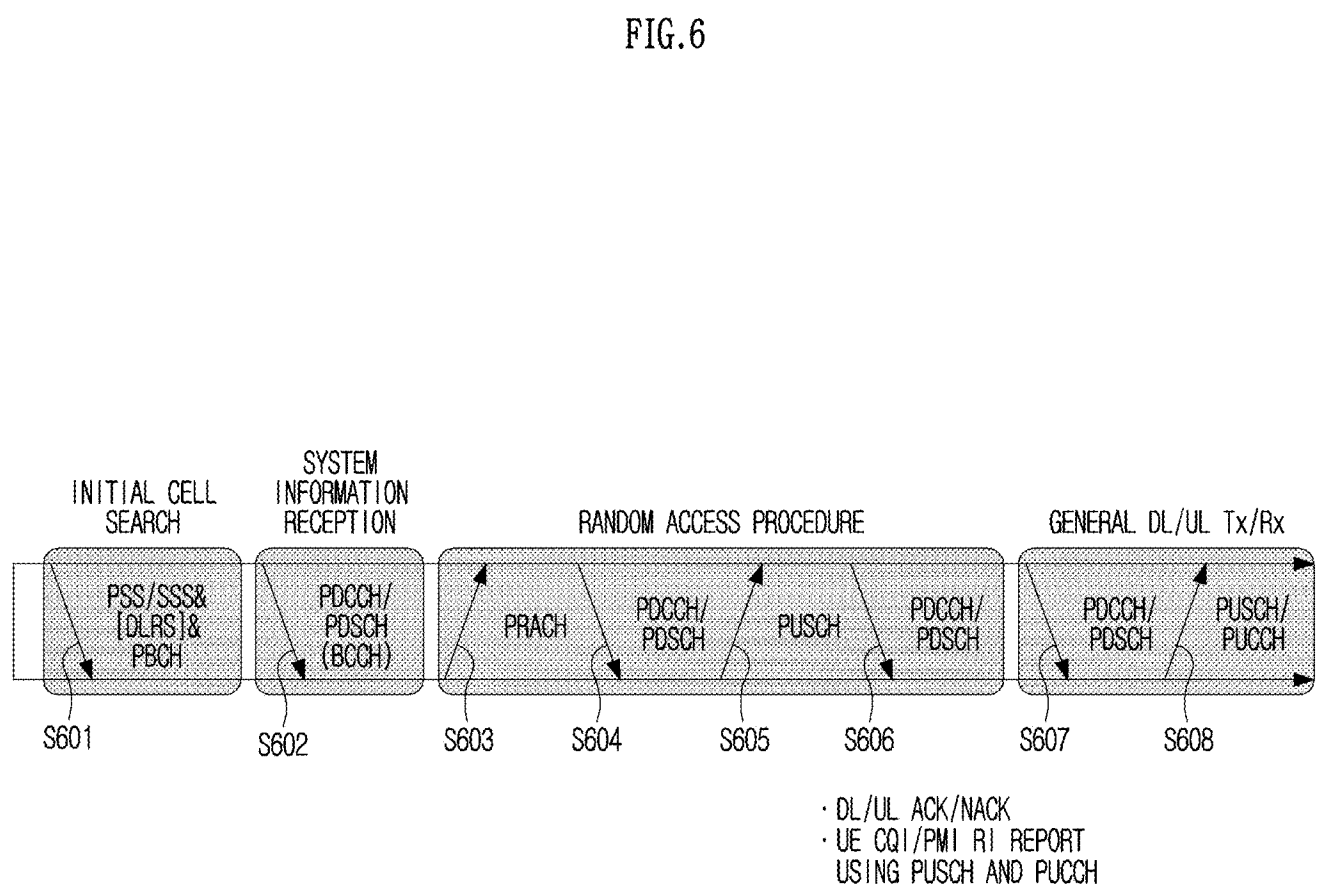

FIG. 6 illustrates physical channels used in a wireless communication system to which the present disclosure may be applied and a general signal transmission and reception method using them.

Figure 7:
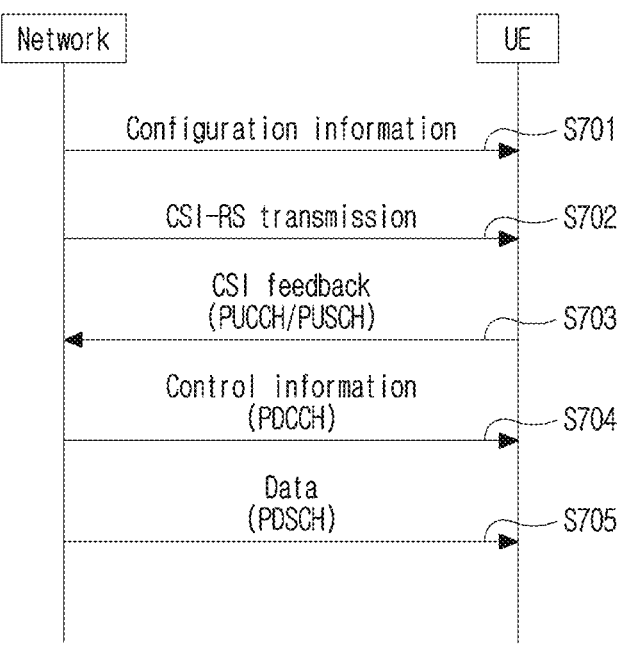

FIG. 7 is a diagram illustrating a signaling procedure between a network and a UE for a method of transmitting and receiving channel state information according to an embodiment of the present disclosure.

Figure 8:
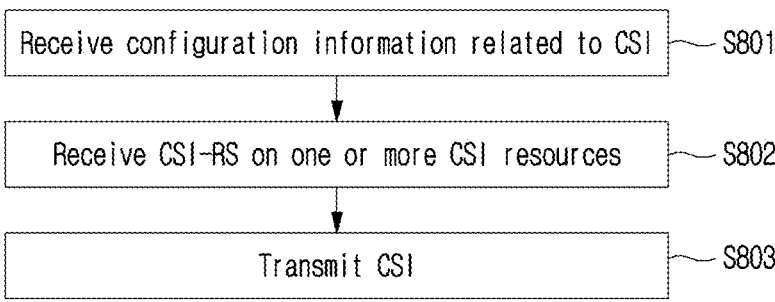

FIG. 8 is a diagram illustrating an operation of a UE in a method for transmitting and receiving channel state information according to an embodiment of the present disclosure.

Figure 9:
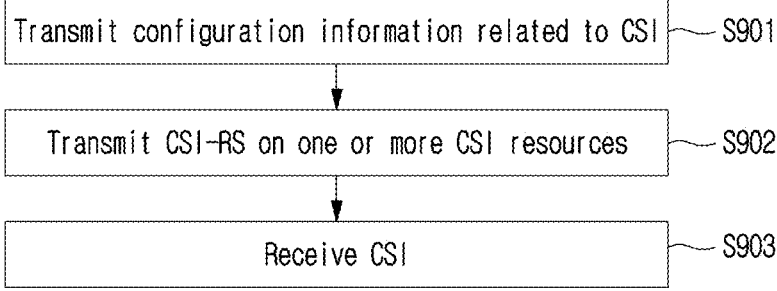

FIG. 9 is a diagram illustrating an operation of a base station in a method for transmitting and receiving channel state information according to an embodiment of the present disclosure.

Figure 10:
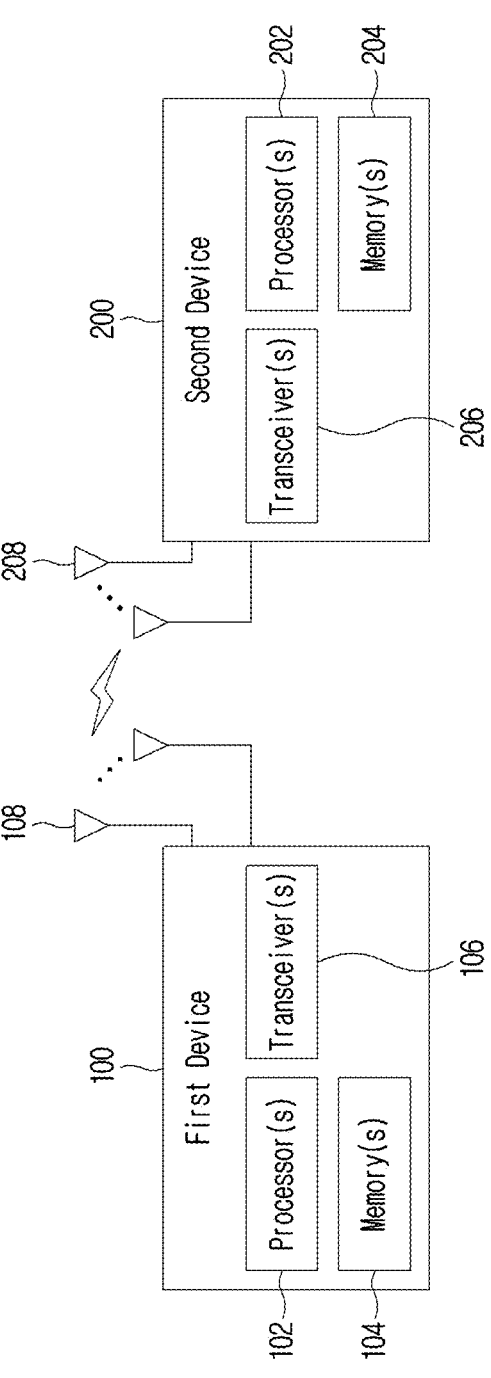

FIG. 10 illustrates a block diagram of a wireless communication device according to an embodiment of the present disclosure.

FIGS. 11A to 11R illustrates the Type II codebook described in 3GPP TS 38.214 in Rel-15 and Rel-16.

DETAILED DESCRIPTION

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

Figure 1:
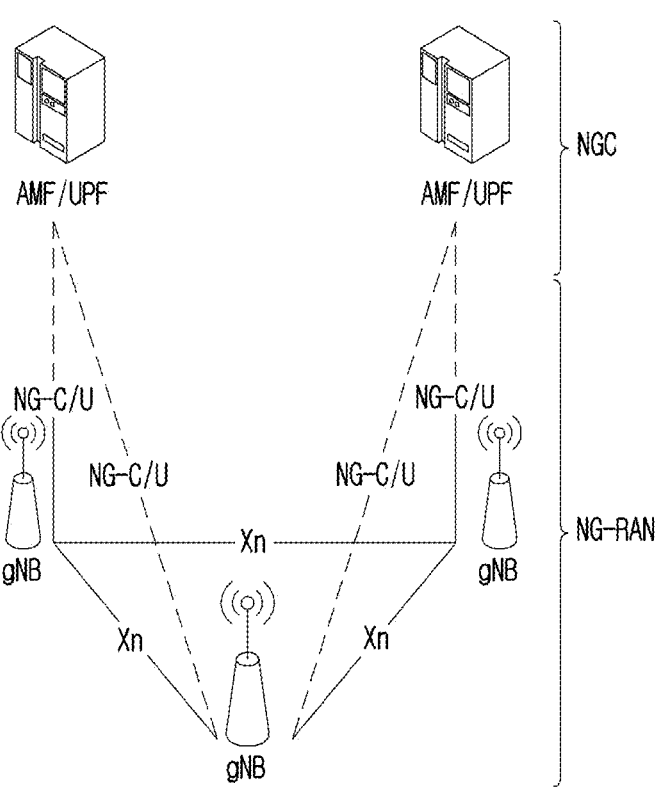
FIG. 1 illustrates a structure of a wireless communication system to which the present disclosure may be applied.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
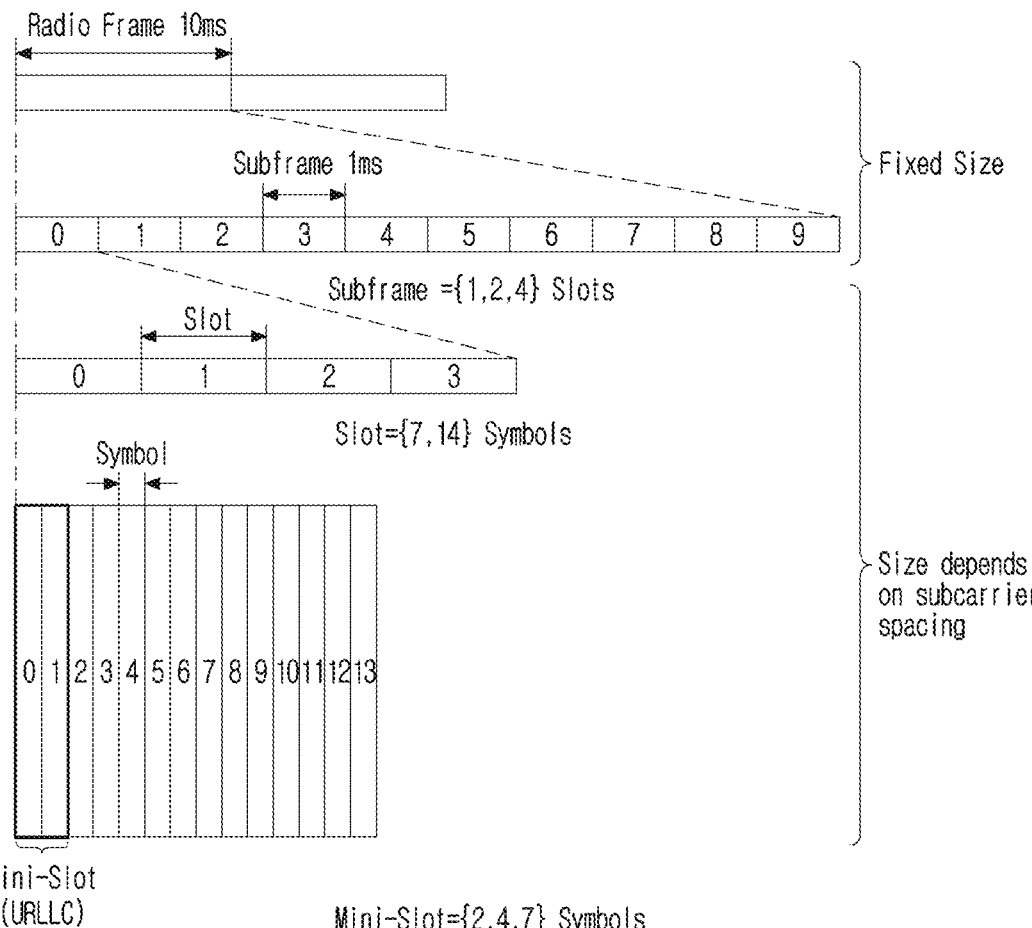
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

7

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu\in\{0, \ldots, N_{slot}^{subframe,\mu}-1\}$ in a subframe and are numbered in an increasing order of $n_{s,f}^\mu\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

8

TABLE 3-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
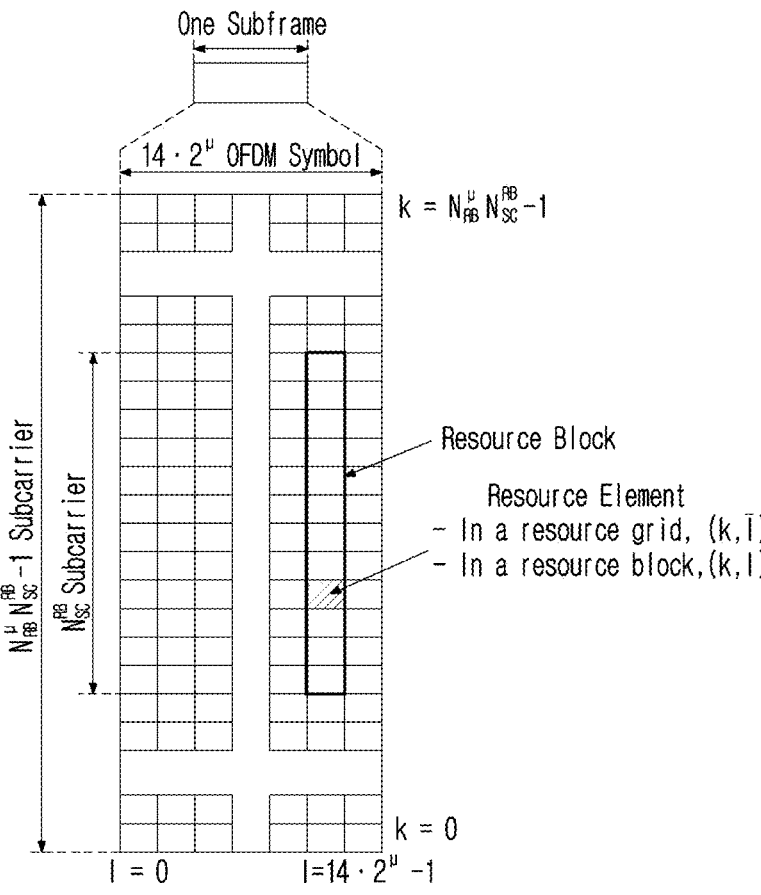
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for u and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block over-
lapped with a SS/PBCH block which is used by a
terminal for an initial cell selection. It is expressed in
resource block units assuming a 15 kHz subcarrier
spacing for FR1 and a 60 kHz subcarrier spacing for
FR2.

absoluteFrequencyPointA represents a frequency-position
of point A expressed as in ARFCN (absolute radio-
frequency channel number).

Common resource blocks are numbered from 0 to the top
in a frequency domain for a subcarrier spacing configuration
μ. The center of subcarrier 0 of common resource block 0 for
a subcarrier spacing configuration u is identical to 'point A'.
A relationship between a common resource block number
$n_{CRB}^{\mu}$ and a resource element (k,l) for a subcarrier spacing
configuration μ in a frequency domain is given as in the
following Equation 1.

$$n_{CRB}^{\mu} = \left\lfloor \frac{k}{N_{SC}^{RB}} \right\rfloor \qquad \text{[Equation 1]}$$

In Equation 1, k is defined relatively to point A so that k=0
corresponds to a subcarrier centering in point A. Physical
resource blocks are numbered from 0 to $N_{BWP,i}^{size,\mu}-1$ in a
bandwidth part (BWP) and i is a number of a BWP. A
relationship between a physical resource block $n_{PRB}$ and a
common resource block $n_{CRB}$ in BWP i is given by the
following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts
relatively to common resource block 0.

Figure 4:
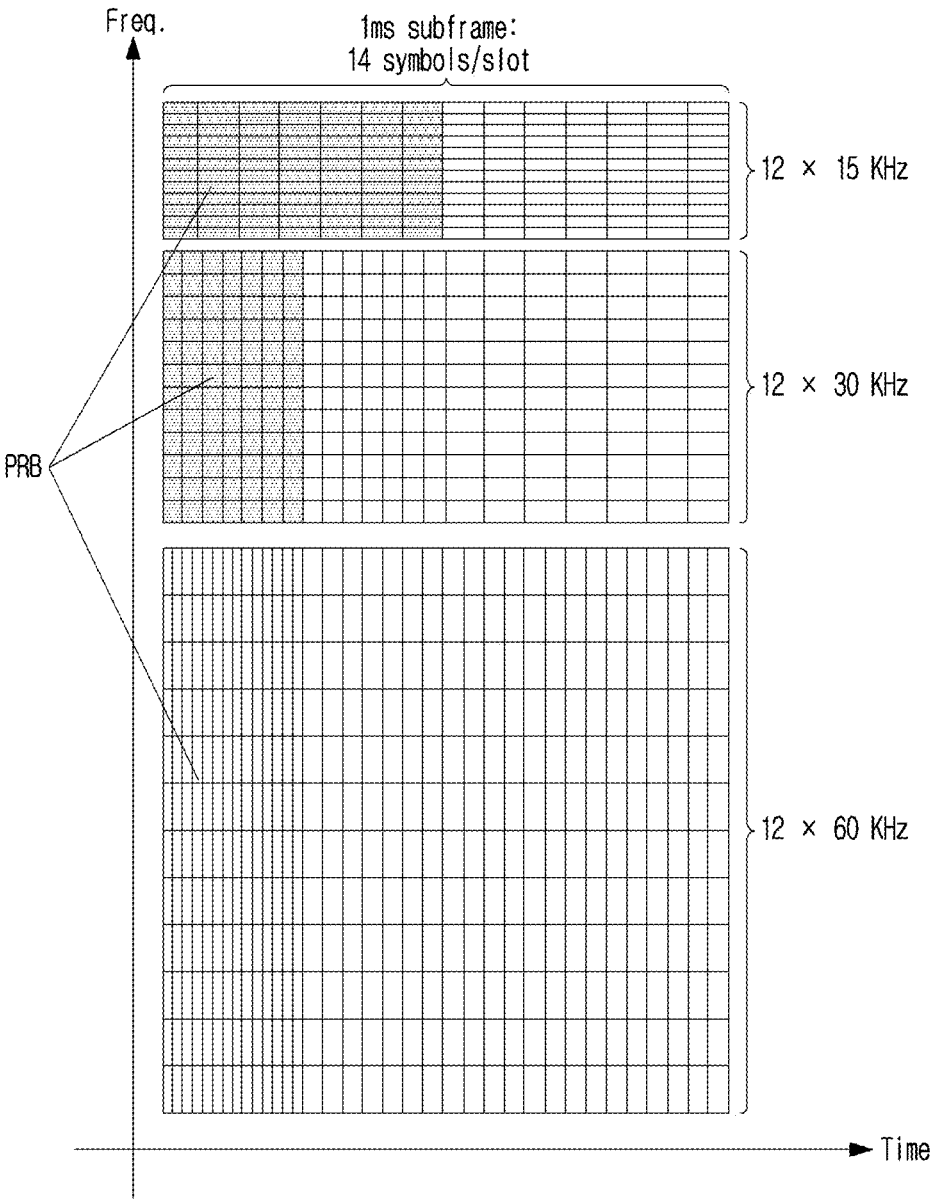
FIG. 4 illustrates a physical resource block in a wireless communication system to which the present disclosure may be applied.

FIG. 4 illustrates a physical resource block in a wireless
communication system to which the present disclosure may
be applied. And, FIG. 5 illustrates a slot structure in a
wireless communication system to which the present dis-
closure may be applied.

In reference to FIG. 4 and FIG. 5, a slot includes a
plurality of symbols in a time domain. For example, for a
normal CP, one slot includes 7 symbols, but for an extended
CP, one slot includes 6 symbols.

A carrier includes a plurality of subcarriers in a frequency
domain. An RB (Resource Block) is defined as a plurality of
(e.g., 12) consecutive subcarriers in a frequency domain. A
BWP (Bandwidth Part) is defined as a plurality of consecu-
tive (physical) resource blocks in a frequency domain and
may correspond to one numerology (e.g., an SCS, a CP
length, etc.). A carrier may include a maximum N (e.g., 5)
BWPs. A data communication may be performed through an
activated BWP and only one BWP may be activated for one
terminal. In a resource grid, each element is referred to as a
resource element (RE) and one complex symbol may be
mapped.

In an NR system, up to 400 MHz may be supported per
component carrier (CC). If a terminal operating in such a
wideband CC always operates turning on a radio frequency
(FR) chip for the whole CC, terminal battery consumption
may increase. Alternatively, when several application cases
operating in one wideband CC (e.g., eMBB, URLLC, Mmtc,
V2X, etc.) are considered, a different numerology (e.g., a
subcarrier spacing, etc.) may be supported per frequency
band in a corresponding CC. Alternatively, each terminal may have a different capability for the maximum bandwidth.
By considering it, a base station may indicate a terminal to
operate only in a partial bandwidth, not in a full bandwidth
of a wideband CC, and a corresponding partial bandwidth is
defined as a bandwidth part (BWP) for convenience. A BWP
may be configured with consecutive RBs on a frequency
axis and may correspond to one numerology (e.g., a sub-
carrier spacing, a CP length, a slot/a mini-slot duration).

Meanwhile, a base station may configure a plurality of
BWPs even in one CC configured to a terminal. For
example, a BWP occupying a relatively small frequency
domain may be configured in a PDCCH monitoring slot, and
a PDSCH indicated by a PDCCH may be scheduled in a
greater BWP. Alternatively, when UEs are congested in a
specific BWP, some terminals may be configured with other
BWP for load balancing. Alternatively, considering fre-
quency domain inter-cell interference cancellation between
neighboring cells, etc., some middle spectrums of a full
bandwidth may be excluded and BWPs on both edges may
be configured in the same slot. In other words, a base station
may configure at least one DL/UL BWP to a terminal
associated with a wideband CC. A base station may activate
at least one DL/UL BWP of configured DL/UL BWP(s) at a
specific time (by L1 signaling or MAC CE (Control Ele-
ment) or RRC signaling, etc.). In addition, a base station
may indicate switching to other configured DL/UL BWP (by
L1 signaling or MAC CE or RRC signaling, etc.). Alterna-
tively, based on a timer, when a timer value is expired, it may
be switched to a determined DL/UL BWP. Here, an activated
DL/UL BWP is defined as an active DL/UL BWP. But, a
configuration on a DL/UL BWP may not be received when
a terminal performs an initial access procedure or before a
RRC connection is set up, so a DL/UL BWP which is
assumed by a terminal under these situations is defined as an
initial active DL/UL BWP.

FIG. 6 illustrates physical channels used in a wireless
communication system to which the present disclosure may
be applied and a general signal transmission and reception
method using them.

In a wireless communication system, a terminal receives
information through a downlink from a base station and
transmits information through an uplink to a base station.
Information transmitted and received by a base station and
a terminal includes data and a variety of control information
and a variety of physical channels exist according to a type/a
usage of information transmitted and received by them.

When a terminal is turned on or newly enters a cell, it
performs an initial cell search including synchronization
with a base station or the like (S601). For the initial cell
search, a terminal may synchronize with a base station by
receiving a primary synchronization signal (PSS) and a
secondary synchronization signal (SSS) from a base station
and obtain information such as a cell identifier (ID), etc.
After that, a terminal may obtain broadcasting information
in a cell by receiving a physical broadcast channel (PBCH)
from a base station. Meanwhile, a terminal may check out a
downlink channel state by receiving a downlink reference
signal (DL RS) at an initial cell search stage.

A terminal which completed an initial cell search may
obtain more detailed system information by receiving a
physical downlink control channel (PDCCH) and a physical
downlink shared channel (PDSCH) according to informa-
tion carried in the PDCCH (S602).

Meanwhile, when a terminal accesses to a base station for
the first time or does not have a radio resource for signal
transmission, it may perform a random access (RACH)
procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a $S \geq 1$ CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a $S \geq 1$ CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number(S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N>1 CSI-ReportConfig reporting setting, M>1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Hereinafter, the CSI reporting configuration defined in 38.214 is described.

A UE calculates CSI parameters by assuming the following dependencies between CSI parameters.

LI is calculated conditional on the reported CQI, PMI, RI and CRI.

CQI is calculated conditional on the reported PMI, RI, and CRI.

PMI is calculated conditional on the reported RI and CRI.

RI is calculated conditional on the reported CRI.

The reporting configuration for CSI may be aperiodic (using PUSCH), periodic (using PUCCH), or semi-persistent (using PUCCH, and PUSCH activated by DCI), and CSI-RS resources may be periodic, semi-persistent or aperiodic. Table 6 below illustrates the supported combinations between CSI reporting configurations and CSI resource configurations and how CSI reporting is triggered for each CSI resource configuration. A periodic CSI-RS is configured by the higher layer. A semi-persistent CSI-RS is activated or deactivated according to the behavior defined in TS 38.214. An aperiodic CSI-RS is configured and triggered/activated according to the operations defined in TS 38.214.

Table 6 illustrates triggering/activation of CSI reporting for possible CSI-RS configurations.

in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to

TABLE 6

| CSI-RS configuration | Periodic CSI reporting | Semi-persistent CSI reporting | Aperiodic CSI reporting |
|---|---|---|---|
| Periodic CSI-RS | No dynamic triggering/activation | In reporting on a PUCCH, a UE receives an activation command. For reporting on a PUSCH, a UE receives triggering on DCI. | Triggered by DCI; Additionally, an activation command is possible. |
| Semi-persistent CSI-RS | Not supported | In reporting on a PUCCH, a UE receives an activation command. For reporting on a PUSCH, a UE receives triggering on DCI. | Triggered by DCI; Additionally, an activation command is possible. |
| Aperiodic CSI-RS | Not supported | Not supported | Triggered by DCI; Additionally, an activation command is possible. |

Hereinafter, information related to activation/deactivation/triggering by MAC-CE related to semi-persistent/aperiodic CSI reporting defined in TS 38.321 is exemplified.

Activation/deactivation of semi-persistent CSI-RS/CSI-IM resource set

By transmitting a semi-persistent (SP) CSI-RS/CSI-IM Resource Set Activation/Deactivation MAC CE, a network may activate and/or deactivate the semi-persistent CSI-RS/CSI-IM resource set configured in a serving cell. The configured semi-persistent CSI-RS/CSI-IM resource set is deactivated initially upon configuration and after handover.

A MAC entity does i) When the MAC entity receives a SP CSI-RS/CSI-IM Resource Set Activation/Deactivation MAC CE on a serving cell, ii) Indicates information related to a SP CSI-RS/CSI-IM Resource Set Activation/Deactivation MAC CE to a lower layer.

Aperiodic CSI trigger state sub-selection

By transmitting an Aperiodic CSI Trigger State Subselection MAC CE, a network may select among the configured aperiodic CSI trigger states of a serving cell.

A MAC entity does i) When the MAC entity receives an Aperiodic CSI Trigger State Subselection MAC CE on a serving cell, ii) Indicates information related to an Aperiodic CSI Trigger State Subselection MAC CE to a lower layer.

Quasi-Co Location (QCL)

An antenna port is defined so that a channel where a symbol in an antenna port is transmitted can be inferred from a channel where other symbol in the same antenna port is transmitted. When a property of a channel where a symbol decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Type-II Codebook

FIGS. 11A to 11R illustrates the Type II codebook described in 3GPP TS 38.214 in Rel-15 and Rel-16.

Method for Transmitting and Receiving Channel State Information

In the present disclosure, '/' may mean including (and) all of the content separated by/or including (or) only part of the separated content.

In Rel-17, the following alternatives (Alts) were discussed at the 3GPP 106-e meeting regarding a method (i.e., reporting is omitted) of not separately reporting a bitmap (i.e., $i_{1,7,1}$ in FIGS. 11A to 11R) for indicating non-zero coefficient(s) (NZC) to a base station by a UE.

1) Proposal 1: In the Rel-17 port selection (PS) codebook, whether a bitmap for indicating non-zero coefficients may be not absent 2) Proposal 2: If a bitmap to indicate non-zero coefficients is absent, one of the following Alts may be selected for the Rel-17 PS codebook:

Alt 1: At least for a rank 1 PMI, if $M_v=1$ and Beta($\beta$)=1, a bitmap to indicate non-zero coefficients is not needed.

Alt 2: For a rank 1/2 PMI, if reported $K^{NZ}=K_1 \ast M_v \ast$rank, a bitmap to indicate non-zero coefficients for the corresponding layer(s) is absent.

Alt 3: In addition to Alt 2, if rank>1, an additional field is reported by a UE to indicate whether a bitmap to indicate non-zero coefficients for a specific layer is absent.

Alt 4: If the number of coefficients is sufficiently small (i.e., $K_1 M_v \leq \delta$), a bitmap to indicate non-zero coefficients is not needed.

The above alternatives may have the advantage of reducing CSI feedback overhead by omitting a bitmap reporting under certain conditions.

However, if bitmap reporting is omitted, an amplitude/phase coefficient should be reported for a spatial domain (SD)/frequency domain (FD) basis combination, which is actually unnecessary. In this case, reporting incorrect coefficients may actually lead to performance degradation.

The present disclosure proposes a method for preventing/complementing the above performance degradation.

Hereinafter, in the method proposed in this disclosure, the operation of the Type II codebook introduced in Rel (release)-15/16 illustrated in FIGS. 11A to 11R can be applied supplementally/together for the operation/implementation of the proposed method of the present disclosure. Accordingly, in describing the proposed method of the present disclosure below, the standard operations illustrated in FIGS. 11A to 11R may be referenced.

Referring to FIGS. 11A to 11R, in the Rel-15 Type II codebook, among oversampled discrete Fourier transform (DFT) vectors, L basis DFT vectors per specific polarization are used. Then, a precoding matrix is constructed by applying a wide band (WB) amplitude coefficient and a sub-band (SB) amplitude/phase coefficient to the corresponding basis DFT vectors. Among the oversampled DFT vectors, a specific vector is equal to $V_{i,m}$ and is defined in the standard as Equation 3 below.

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases} \quad \text{[Equation 3]}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

Here, $N_1$ and $N_2$ represent a number of antenna ports in a first dimension and a second dimension, respectively, and are configured by the higher layer parameter n1-n2-codebookSubsetRestriction. A number of CSI-RS ports ($P_{CSI-RS}$) is $2N_1 N_2$. $O_1$ and $O_2$ represent oversampling factors in a first dimension and a second dimension, respectively. The supported configurations of $(N_1, N_2)$ and $(O_1, O_2)$ for a given number of CSI-RS ports are defined in the standard.

L represents a number of beams, and the L value is configured by the higher layer parameter numberOfBeams. Here, when $P_{CSI-RS}=4$, L=2, and when $P_{CSI-RS}>4$, L={2,3,4}.

The codebook for layer 1 and layer 2 is defined in the standard, where the indices $m_1^{(i)}$ and $m_2^{(i)}$ as in Equation 4 below are applied to l and m in Equation 3, respectively, and a precoding matrix is constructed based on this DFT basis vector.

$$m_1^{(i)} = O_1 n_1^{(i)} + q_1 \quad \text{[Equation 4]}$$

$$m_2^{(i)} = O_2 n_2^{(i)} + q_2$$

Here, i is 0, 1, . . . , L–1. $n_1^{(i)} \in \{0, 1, \ldots, N_1-1\}$, and $n_2^{(i)} \in \{0, 1, \ldots, N_2-1\}$. $q_1 \in \{0, 1, \ldots, O_1-1\}$, and $q_2 \in \{0, 1, \ldots, O_2-1\}$. The values of $n_1^{(i)}$ and $n_2^{(i)}$ are determined according to the algorithm defined in the standard.

The Rel-15 Type II port selection codebook is a method in a precoding matrix is constructed by replacing L basis DFT vectors per specific polarity (pole) with beamformed CSI-RS ports in the above-mentioned Rel-15 Type II codebook.

The Rel-16 Type II codebook is a method of compressing and reporting codebook information using correlation in a frequency domain with respect to the Rel-15 Type II codebook described above. Here, in order to compress codebook information, compressed information may be configured based on a set of some vectors of an oversampled DFT codebook. Here, the set of some vectors of the oversampled DFT codebook can be referred to as 'frequency domain (FD) basis vectors.'

$M_v$ FD basis vectors are defined in the standard as shown in Equation 5 below.

$$\begin{bmatrix} y_{0,l}^{(f)}, y_{1,l}^{(f)}, \ldots, y_{N_3-1,l}^{(f)} \end{bmatrix}^T \quad \text{[Equation 5]}$$

Here, f=0, 1, . . . , $M_v-1$. $N_3$ is the total number of precoding matrices. l=1, . . . , $\upsilon$, and $\upsilon$ is a rank indicator (RI) value.

Among the $M_v$ FD basis vectors as above, the t-th element of the f-th vector (where t=0, . . . , $N_3-1$) is equal to $y_{t,l}^{(f)}$, and if is defined in the standard as shown in Equation 6 below.

$$y_{t,l}^{(f)} = e^{j\frac{2\pi t n_{3,l}^{(f)}}{N_3}} \quad \text{[Equation 6]}$$

Here, $n_{3,l}$ is defined in the standard as shown in Equation 7 below.

$$n_{3,l} = \begin{bmatrix} n_{3,l}^{(0)}, \ldots, n_{3,l}^{(M_v-1)} \end{bmatrix} \quad \text{[Equation 7]}$$

$$n_{3,l}^{(f)} \in \{0, 1, \ldots, N_3-1\}$$

Here, f=0, 1, . . . , $M_v-1$. In the above equation, through the $n_{3,l}^{(f)}$ value, Mu FD basis vector combinations selected by a UE among oversampled DFT codebooks (i.e., among the total number of precoding matrices) of size $N_3$ can be reported to a base station.

In addition, in the enhanced Type II codebook in FIGS. 11A to 11R, a precoding matrix may be indicated by a PMI reported by a UE to a base station, and the precoding matrix can be determined from L vectors (i.e., the L value represents the number of beams and is configured by the higher layer parameter numberOfBeams)+$M_v$ vectors (i.e., the number of FD basis vectors configured by a base station). Here, the L vectors may be identified by indices $n_1 \in \{0, 1, \ldots, N_1-1\}$ (the number of antenna ports in a first dimension), $n_2 \in \{0, 1, \ldots, N_2-1\}$ (number of antenna ports in a second dimension), $q_1 \in \{0, 1, \ldots, O_1-1\}$ (oversampling value in a first dimension), and $q_2 \in \{0, 1, \ldots, O_2-1\}$ (oversampling value in a second dimension) indicated by $i_{1,1}, i_{1,2}$.

Here, a PMI corresponds to codebook indices $i_1$ and $i_2$. $i_1$ and $i_2$ may each be configured with multiple indices depending on a number of ranks ($v$), as described in FIGS. 11A to 11R. That is, a PMI may include indices included in $i_1$ and $i_2$ (or indicators indicating the corresponding indices). For example, in the enhanced Type II codebook, when $v=1$, $i_1$ may include $i_{1,1}, i_{1,2}, i_{1,5}, i_{1,6,1}, i_{1,7,1}, i_{1,8,1}$. As another example, if $v=2$, $i_2$ may include $i_{2,3,1}, i_{2,4,1}, i_{2,5,1}, i_{2,3,2}, i_{2,4,2}, i_{2,5,2}$. Here, $i_{2,4,l}$ (l=1,2,3,4) corresponds to an amplitude coefficient indicator for indicating an amplitude coefficient. Here, $i_{2,5,l}$ (l=1,2,3,4) corresponds to a phase coefficient indicator for indicating a phase coefficient.

Below illustrates the description in 3GPP TS 38.214 related to reporting the total number of non-zero coefficients (NZC) of CSI part 1.

Table 8 illustrates the mapping of CSI part 1 and CSI fields of one CSI report.

TABLE 10

Let $K_0 = \lceil \beta 2LM_1 \rceil$. The bitmap whose nonzero bits identify which coefficients in $i_{2,4,l}$ and $i_{2,5,l}$ are reported, isindicated by $i_{1,7,l}$ $$i_{1,7,l} = [k_{l,0}^{(3)} \ldots k_{l,M_v-1}^{(3)}]$$

$$k_{l,f}^{(3)} \cdot [k_{l,0,f}^{(3)} \ldots k_{l,2L-1,f}^{(3)}]$$

$$k_{l,i,f}^{(3)} \in \{0, 1\}$$

for l = 1, ... ,$v$, such that $K_l^{NZ} = \sum_{i=0}^{2L-1} \sum_{f=0}^{M_v-1} k_{l,i,f}^{(3)} \leq K_0$ is the number of nonzero coefficients for layer l = 1, ... , $v$ and $$K_l^{NZ} = \sum_{i=0}^{2L-1} \sum_{f=0}^{M_v-1} k_{l,i,f}^{(3)} \leq K_0$$

is the total number of nonzero coefficients.

Referring to Table 10, a bitmap identifies coefficients reported in $i_{2,4,l}$ (l=1,2,3,4) (i.e., amplitude coefficient indicator) and $i_{2,5,l}$ (l=1,2,3,4) (i.e., phase coefficient indicator), and in the bitmap, bits with a value other than 0 represent coefficients that are reported, and bits with a value of 0 represent coefficients that are not reported.

A length of the bitmap can be determined based on a number of L vectors and a number of Mu vectors for each layer. That is, each bit of the bitmap may correspond to an amplitude coefficient and a phase coefficient for each of combinations between the L vectors and the Mu vectors (i.e., SD basis-FD basis combinations). That is, 1 bit may correspond to an amplitude coefficient and 1 bit may correspond

TABLE 8

| CSI report number | CSI fields |
|---|---|
| CSI report #n | CRI |
| CSI part 1 | RI |
| | Wideband CQI for first TB |
| | Indicator of the number of non-zero wideband amplitude coefficients $M_0$ for layer 0 |
| | Indicator of the number of non-zero wideband amplitude coefficients $M_1$ for layer 1 (if a rank according to the reported RI is equal to one, this field is set to all zeos.) |
| | Indicator of the total number of non-zero coefficients summed across all layers $K^{NZ}$ |

Subbands for given CSI report n indicated by the higher layer parameter csi-ReportingBand are numbered continuously in the increasing order with the lowest subband of csi-ReportingBand as subband 0.

Table 9 illustrates the RI and CQI of codebookType=typeII-r16 or typeII-PortSelection-r16.

TABLE 9

| Field | Bitwidth |
|---|---|
| RI | Min(2, ceiling($\log_{2 nRI}$)) |
| Wideband CQI | 4 |
| Subband differential CQI | 2 |
| Indicator of the total number of non-zero coefficients summed across all layers $K^{NZ}$ | Ceiling($\log_2(K_0)$) if max allowed rank is 1; Ceiling($\log_2(2K_0)$) otherwise |

As described above, CSI part 1 in a CSI report includes an indicator for the total number of non-zero coefficients in a bitmap, and an actual bitmap may be included in CSI part 2. Additionally, a PMI including values of each amplitude/phase coefficient may also be included in CSI part 2.

Table 10 below illustrates the description in 3GPP TS 38.214 regarding bitmap ($i_{1,7,l}$).

coefficient corresponding to the specific bit may be omitted (i.e., reporting of amplitude coefficient indicator $i_{2,4,l}$ or phase coefficient indicator $i_{2,5,l}$ is omitted). Additionally, the bitmap for each layer may be composed of a total of 2 L*M bits.

In addition, as shown in Table 11 below, each amplitude coefficient indicator $i_{2,4,l}$ can indicate one of 0 to 7, and each value may indicate a different amplitude coefficient (i.e. map/correspond to a different amplitude coefficient).

TABLE 11

| $k_{l,i,f}^{(2)}$ | $p_{l,i,f}^{(2)}$ |
|---|---|
| 0 | $\dfrac{1}{8\sqrt{2}}$ |
| 1 | $\dfrac{1}{8}$ |
| 2 | $\dfrac{1}{4\sqrt{2}}$ |
| 3 | $\dfrac{1}{4}$ |
| 4 | $\dfrac{1}{2\sqrt{2}}$ |
| 5 | $\dfrac{1}{2}$ |
| 6 | $\dfrac{1}{\sqrt{2}}$ |
| 7 | 1 |

In the following description of the methods proposed in the present disclosure, for convenience of explanation, the Type II codebook, Type II port selection codebook, and enhanced Type II codebook defined in the standard (see FIGS. 11A to 11R) are mainly described, but the present disclosure is not limited thereto. That is, the methods proposed in the present disclosure below can be applied to a codebook based on linear combining.

Proposal #1: Method for omitting bitmap reporting for NZC indication

Proposal #A1: When reporting bitmap (e.g., $i_{1,7,l}$) for an NZC indication is omitted based on base station configuration and/or UE implementation, for amplitude code-points (or states) (e.g. $i_{2,4,l}$) defined for amplitude reporting on a specific SD basis-FD basis combination, an operation can be defined to reinterpret a value of a specific code-point (or state) as 0.

In other words, if a PMI does not include a bitmap to identify which coefficients are reported by one or more amplitude coefficient indicators and one or more phase coefficient indicators (i.e., reporting is omitted), although a mapping (e.g., amplitude table as in Table 11 above) in which a non-zero amplitude coefficient is indicated (corresponding) is predefined for each of values of amplitude coefficient indicators (i.e. amplitude code-points or states), an amplitude coefficient for a specific value of an amplitude coefficient indicator may be regarded as 0 by a base station and/or a UE.

As an example for applying Proposal #A1 described above, Table 11 defined for $i_{2,4,l}$ in Rel-16 can be used for the amplitude code-point (or state).

In other words, when applying the above-described Proposal #A1, an amplitude coefficient (i.e., $p_{l,i,f}(2)$) corresponding to a specific code-point (or state) among 8 code-points (or states) (i.e., values of the amplitude coefficient indicators, e.g., 0 to 7) in Table 11 may be reinterpreted/regarded as 0. Here, for example, there may be one or more specific code-points (or states). Additionally, the code-point (or state) may be the lowest code-point (or state) (i.e., 0 in Table 11) or the highest code-point (or state) (i.e., 7 in Table 11).

For example, when applying Proposal #A1 described above, operations of a base station and a terminal may be as follows. If a UE does not omit bitmap reporting, the 8 amplitude code-points (or states) may be interpreted/regarded as values defined in the current standard (e.g., Table 11). For example, an amplitude coefficient value (i.e., $p_{l,i,f}^{(2)}$) for the code-point (or state) where $k_{l,i,f}^{(2)}=0$ can be interpreted/regarded as $$\frac{1}{8\sqrt{2}}.$$

On the other hand, if a UE omits bitmap reporting, an amplitude coefficient value (i.e., $p_{l,i,f}^{(2)}$) for the code-point (or state) where $k_{l,i,f}^{(2)}=0$ can be interpreted/regarded as 0.

As described above, according to the existing operation, when a UE reports a bitmap, an amplitude coefficient corresponding to a bit with 0 value of the bitmap may be omitted from reporting. However, if bitmap reporting is omitted, an amplitude coefficient should always be reported. According to an code-point (state) of an amplitude coefficient indicator ($i_{2,4,l}$) defined in the current standard, since an amplitude coefficient of 0 cannot be reported, even if a UE wants to report an amplitude coefficient of 0, a problem arises in which a specific amplitude coefficient value must always be reported. However, according to this proposal, even when a UE omits bitmap reporting, it is possible to prevent unnecessary amplitude coefficients from being reported for unnecessary SD/FD basis combinations, and performance degradation can be prevented.

Proposal #A1-1: Based on Proposal #A1 above, when amplitude 0 is reported for a specific SD basis-FD basis combination, reporting a phase value for that combination may be omitted.

In other words, if an amplitude is 0, reporting a phase coefficient is meaningless, so payload ambiguity/overhead can be eliminated by omitting reporting the phase coefficient.

Proposal #A2: When reporting bitmap (e.g., $i_{1,7,l}$) for an NZC indication is omitted based on base station configuration and/or UE implementation, a new amplitude table can be considered defined/configured/enabled.

Here, the amplitude table refers to a table that defines/configures efficient values corresponding to each value of efficient indicators, as shown in Table 11, and in this disclosure, a table may be referred to as mapping (relationship)/correspondence (relationship).

In proposal A1-2, if bitmap reporting is indicated to be omitted by configuration of a base station (or omitted based on implementation of a UE), an amplitude granularity (i.e., step size, e.g. −3 dB, −1.5 dB) and/or a table size (or a bit size of an amplitude coefficient indicator, e.g. 3 bits or 4 bits) may be defined/configured differently.

For example, if a UE does not omit bitmap reporting, the 8 amplitude code-points (or states) may be interpreted/regarded as values defined in the current standard (e.g., Table 11). On the other hand, if a UE omits bitmap reporting, a step size (i.e., a size of increase/decrease in an amplitude coefficient value as a code-point increases/decreases by 1) in Table 11 may be defined/configured larger or smaller and/or a size of the table may also be defined/configured larger or smaller. For example, as a step size is configured/defined smaller, an amplitude coefficient value can be further refined. In addition, even if an amplitude coefficient value is further refined, a size of a table may be the same (i.e., a bitwidth of an amplitude coefficient indicator is maintained) or a size of a table may be larger (i.e., configured/defined a bitwidth of an amplitude coefficient indicator to be larger).

For example, if bitmap reporting is omitted, Table 12 below may be used to define/configure a mapping/correspondence between an amplitude coefficient indicator and an amplitude coefficient.

For example, if a UE does not omit bitmap reporting, the 8 amplitude code-points (or states) may be interpreted/regarded as values defined in the current standard (e.g., Table 11). On the other hand, if a UE omits bitmap reporting, the 16 amplitude code-points (or states) defined in Table 12 below can be used.

TABLE 12

| $k_{l,p}^{(1)}$ | $p_{l,p}^{(1)}$ |
|---|---|
| 0 | 0 |
| 1 | $\dfrac{1}{\sqrt{128}}$ |
| 2 | $\left(\dfrac{1}{8192}\right)^{1/4}$ |
| 3 | $\dfrac{1}{8}$ |
| 4 | $\left(\dfrac{1}{2048}\right)^{1/4}$ |
| 5 | $\dfrac{1}{2\sqrt{8}}$ |
| 6 | $\left(\dfrac{1}{512}\right)^{1/4}$ |
| 7 | $\dfrac{1}{4}$ |
| 8 | $\left(\dfrac{1}{128}\right)^{1/4}$ |
| 9 | $\dfrac{1}{\sqrt{8}}$ |
| 10 | $\left(\dfrac{1}{32}\right)^{1/4}$ |
| 11 | $\dfrac{1}{2}$ |
| 12 | $\left(\dfrac{1}{8}\right)^{1/4}$ |
| 13 | $\dfrac{1}{\sqrt{2}}$ |
| 14 | $\left(\dfrac{1}{2}\right)^{1/4}$ |
| 15 | 1 |

Table 12 has different variables from Table 11, but in this disclosure, kl,p(1) can be interpreted as an amplitude coefficient indicator, and pl,p(1) can be interpreted as an amplitude coefficient.

In other words, if bitmap reporting is omitted, a mapping between an amplitude coefficient indicator and an amplitude coefficient defined to include (i.e., to include an amplitude coefficient of 0) a value of an amplitude coefficient indicator indicating an amplitude coefficient of 0 can be used.

In this way, when Table 12 is used, an amplitude coefficient of 0 can be indicated using an code point (or state) 0 value, so unnecessary amplitude coefficient can be prevented from being reported as a bitmap is omitted.

In addition, according to the existing standard, the amplitude table applied to inter-polarization (e.g., see Table 5.2.2.2.5-2 in TS 38.214 and FIGS. 11A to 11R) and the amplitude table applied to intra-polarization (e.g., see Table 5.2.2.2.5-3 in TS 38.214 and FIGS. 11A to 11R) were defined separately. However, in proposal A1-2, if bitmap reporting is indicated to be omitted by configuration of a base station (or omitted based on implementation of a UE), only one amplitude table can be used (i.e., without distinguishing between inter polarization and intra polarization) and an amplitude can be quantized. This operation can also be applied to Proposal A1-1 above. Here, one amplitude table can be any one of Table 5.2.2.2.5-2 in TS 38.214, Table 5.2.2.2.5-3 in TS 38.214, Table 11, and Table 12.

In other words, even though multiple mappings between an amplitude coefficient indicator and an amplitude coefficient are predefined when bitmap reporting is not omitted, when bitmap reporting is omitted, a single mapping/correspondence relationship (or table) can be used among multiple mappings/correspondences (or tables).

Proposal #A1-3: If a UE determines that it is beneficial to omit bitmap reporting based on the UE's NZC calculation, the UE may omit bitmap reporting in CSI Part 2. In this case, the UE can report to a base station including information one the omission of bitmap reporting in CSI Part 1.

In the above proposal A1-3, whether a bitmap is reported in CSI Part 1 is 1 bit, and a UE can use 1 bit to inform a base station whether a bitmap is reported. Additionally, as a method to omit bitmap reporting of a UE, a base station can transmit/configure an additional threshold for the UE. That is, a base station can provide information on a threshold for determining whether to report a bitmap to a UE.

Here, the threshold may be a threshold for a number of NZCs (a number of NZCs per layer or summed across all layers). For example, if a number of NZCs calculated by a UE (i.e., non-zero amplitude coefficients and/or phase coefficients for each layer or summed across all layers) is greater than (greater than or equal to) the threshold, the UE may omit bitmap reporting. On the other hand, if a number of NZCs calculated by a UE (i.e., non-zero amplitude coefficients and/or phase coefficients for each layer or summed across all layers) is smaller (smaller or equal) than the threshold, the UE may perform bitmap reporting.

Meanwhile, the above proposed methods (e.g., Proposal #A1/#A1-1/#A1-2/#A1-3, etc.) can be applied for each layer, or for each polarization, or for each layer per polarization. That is, when applied for each polarization, bitmap reporting corresponding to a specific polarization may be omitted.

In addition, the above proposed methods (e.g., Proposal #A1/#A1-1/#A1-2/#A1-3, etc.) may be applied independently as a single method, or multiple methods may be applied in combination.

FIG. 7 is a diagram illustrating a signaling procedure between a network and a UE for a method of transmitting and receiving channel state information according to an embodiment of the present disclosure.

FIG. 7 exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., any one or a combination of Proposal #A1/#A1-1/#A1-2/#A1-3) proposed in the present disclosure may be applied.

Here, UE/Network may be an example and may be applied by being substituted with a variety of devices as described in FIG. 10. FIG. 7 is only for convenience of description, but it is not intended to limit a scope of the present disclosure. In addition, some step(s) shown in FIG. 7 may be omitted according to a situation and/or a configuration, etc.

In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

In addition, as described above, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, a base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc.

Referring to FIG. 7, for convenience of explanation, signaling between one network (base station) and a UE is considered, but of course, the signaling method can be extended and applied to signaling between multiple TRPs and multiple UEs.

Referring to FIG. 7, a network transmits configuration information related to channel state information (CSI) to a UE (S701). That is, a UE receives configuration information related to channel state information (CSI) from a network.

The configuration information related to the CSI may include at least one of information related to CSI-IM (interference management) resource, information related to CSI measurement configuration, information related to CSI resource configuration, information related to CSI-RS resource or information related to CSI report configuration.

In addition, the configuration information related to CSI may include information on the above-described proposed method (e.g., any one or a combination of Proposal #A1/#A1-1/#A1-2/#A1-3).

For example, configuration to Proposal #A1-1 described above, the setting information may include information for configuring/indicating that a bitmap is not reported in a PMI.

For example, according to Proposal #A1-2 described above, depending on whether a UE reports a bitmap (i.e., a bitmap to identify which coefficients are reported by one or more amplitude coefficient indicators and one or more phase coefficient indicators) included in a PMI, a mapping/correspondence relationship (or table, i.e. amplitude table) between a value of an amplitude coefficient indicator and a value of an amplitude coefficient may be applied differently. In this case, the configuration information may include information on a mapping/correspondence relationship (or table) used when reporting of a bitmap is omitted.

In addition, depending on whether a UE reports a bitmap (i.e., a bitmap to identify which coefficients are reported by one or more amplitude coefficient indicators and one or more phase coefficient indicators) included in a PMI, in the mapping/correspondence relationship (or table), a granularity of amplitude and/or a table size (or a bit size of an amplitude coefficient indicator, e.g. 3 bits or 4 bits) may be configured/defined differently. In this case, the configuration information may include information on a granularity of amplitude and/or a table size (or, a bit size of an amplitude coefficient indicator) for the mapping/correspondence relationship (or table) used when reporting of a bitmap is omitted.

In addition, although a plurality of mapping/correspondence relationships (or tables) between amplitude coefficient indicators and amplitude coefficients are predefined when bitmap reporting is not omitted, when bitmap reporting is omitted, a single mapping/correspondence relationship (or table) can be used among a plurality of mapping/correspondence relationships (or tables). In this case, the configuration information may include information on a single mapping/correspondence relationship (or table) used when reporting of a bitmap is omitted.

In addition, according to the above-described Proposal #A1-3, the configuration information related to CSI may include information for a UE to determine whether a bitmap (i.e., a bitmap to identify which coefficients are reported by one or more amplitude coefficient indicators and one or more phase coefficient indicators) is included in a PMI and reported. For example, this information may include information on a threshold for a number of non-zero coefficients in order for a UE to determine whether to report a bitmap according to a number of NZCs.

A network transmits a CSI-RS to a UE on one or more CSI-RS resources (S702). That is, a UE receives a CSI-RS from a network on one or more CSI-RS resources.

Here, a UE may receive a CSI-RS through one or more antenna ports on one or more CSI-RS resources based on the configuration information.

A network receives channel state information (CSI) feedback (report) from a UE (S703). That is, a UE transmits channel state information (CSI) feedback (report) to a network.

Here, channel state information (CSI) feedback (report) may be transmitted through an uplink physical layer channel (e.g., PUCCH or PUSCH).

The CSI reported by a UE to a network can be derived/ generated based on the above-described proposed method (e.g., any one or a combination of Proposal #A1/#A1-1/ #A1-2/#A1-3).

For example, CSI may include CSI part 1 and CSI part 2, and CSI part 2 may include a PMI corresponding to indexes of a codebook for indicating a precoding matrix. Here, the codebook may correspond to a codebook based on linear combining. Additionally, the PMI may include one or more amplitude coefficient indicators for indicating amplitude coefficients and/or one or more phase coefficient indicators for indicating phase coefficients.

Additionally, CSI part 2 may include a bitmap for identifying which coefficients are reported by the one or more amplitude coefficient indicators and the one or more phase coefficient indicators. Additionally, a number of non-zero amplitude coefficients and phase coefficients summed across all layers may be included in CSI part 1.

However, based on the above-described proposed method (e.g., any one or a combination of Proposal #A1/#A1-1/ #A1-2/#A1-3), the bitmap may not be reported (i.e., reporting may be omitted) in CSI part 2 (e.g., PMI).

For example, according to Proposal #A1 described above, if reporting of a bitmap is omitted, although a mapping/ correspondence (or table) indicating a non-zero amplitude coefficient according to each of the values of amplitude coefficient indicators is predefined/preconfigured, an amplitude coefficient for a specific value of an amplitude coefficient indicator may be regarded as 0 by a network and/or UE.

Additionally, a phase coefficient corresponding to the amplitude coefficient considered to be 0 depending on the specific value of the amplitude coefficient indicator may not be reported in the PMI. That is, if an amplitude coefficient is reported as 0 for a specific SD basis-FD basis combination, reporting on a phase coefficient value for the combination may be omitted.

In addition, according to Proposal #A1-1 described above, if the bitmap is configured/indicated not to be reported in a PMI by the configuration information, reporting of the bitmap may be omitted in the PMI.

Additionally, according to Proposal #A2 described above, when reporting of a bitmap is omitted, a mapping/correspondence (or table) between amplitude coefficients indicator and amplitude coefficients may be defined/configured differently (compared to when reporting of a bitmap is performed). For example, an amplitude granularity (i.e. step size, e.g. −3 dB, −1.5 dB) and/or mapping/correspondence (or table) size (or a bit size of an amplitude coefficient indicator, e.g. 3 bits or 4 bits) may be defined/configured differently. In this case, a value of the reported amplitude coefficient indicator can be interpreted based on the defined/ configured mapping/correspondence (or table).

In addition, according to Proposal #A2 described above, if reporting of a bitmap is omitted, a mapping/correspondence (or table) between amplitude coefficient indicators and amplitude coefficients defined to include (i.e., to include an amplitude coefficient of 0) a value of an amplitude coefficient indicator indicating an amplitude coefficient of 0 may be used. In this case, a value of the reported amplitude coefficient indicator can be interpreted based on the corresponding mapping/correspondence (or table).

In addition, even though multiple mappings/correspondences (or tables) between amplitude coefficient indicators and amplitude coefficients are predefined when bitmap reporting is not omitted, when bitmap reporting is omitted, a single mapping/correspondence relationship (or table) can be used among multiple mappings/correspondences (or tables). In this case, a value of the reported amplitude coefficient indicator can be interpreted based on the corresponding mapping/correspondence (or table).

In addition, according to Proposal #A3 described above, a UE can receive information to determine whether to report a bitmap from a network. For example, this information may include information on a threshold for a number of non-zero coefficients in order for a UE to determine whether to report a bitmap according to a number of NZCs. In this case, when a number of non-zero amplitude coefficients and/or phase coefficients per layer or summed across all layers is greater than (or greater than or equal to) the threshold, the bitmap may not be reported in the PMI.

A network may transmit DCI scheduling a PDSCH to a UE (S704). That is, a UE can receive DCI scheduling a PDSCH from a network.

Here, DCI may be transmitted through a physical channel (e.g., PDCCH). Additionally, DCI may include scheduling information for a PDSCH.

Additionally, DCI may include beam information for PDSCH transmission. For example, the beam information may include at least one of a quasi co-location (QCL) source and a TCI state index.

A network may transmit downlink data to a UE (S705). That is, a UE can receive downlink data from a network.

Here, downlink data may be transmitted through a physical channel (e.g., PDSCH).

FIG. 8 is a diagram illustrating an operation of a UE in a method for transmitting and receiving channel state information according to an embodiment of the present disclosure.

FIG. 8 exemplifies an operation of a UE based on the above-described proposed method (e.g., any one or a combination of Proposal #A1/#A1-1/#A1-2/#A1-3). FIG. 8 is only for convenience of description, but it is not intended to limit a scope of the present disclosure. Some step(s) shown in FIG. 8 may be omitted according to a situation and/or a configuration, etc. In addition, a UE in FIG. 8 is only one example, and may be implemented as a device illustrated in FIG. 10. For example, a processor (102/202) of FIG. 10 may control to transmit and receive channel/signal/data/information, etc. (e.g., RRC signaling, MAC CE, DCI for UL/DL scheduling, SRS, PDCCH, PDSCH, PUSCH, PUCCH, etc.) by using a transceiver (106/206), and control to store transmitted or received channel/signal/data/information in a memory (104/204).

Referring to FIG. 8, a UE receives configuration information related to channel state information (CSI) from a base station (S801).

The configuration information related to the CSI may include at least one of information related to CSI-IM (interference management) resource, information related to CSI measurement configuration, information related to CSI resource configuration, information related to CSI-RS resource or information related to CSI report configuration.

In addition, the configuration information related to CSI may include information on the above-described proposed method (e.g., any one or a combination of Proposal #A1/ #A1-1/#A1-2/#A1-3).

For example, configuration to Proposal #A1-1 described above, the setting information may include information for configuring/indicating that a bitmap is not reported in a PMI.

For example, according to Proposal #A1-2 described above, depending on whether a UE reports a bitmap (i.e., a bitmap to identify which coefficients are reported by one or more amplitude coefficient indicators and one or more phase coefficient indicators) included in a PMI, a mapping/correspondence relationship (or table, i.e. amplitude table) between a value of an amplitude coefficient indicator and a value of an amplitude coefficient may be applied differently. In this case, the configuration information may include information on a mapping/correspondence relationship (or table) used when reporting of a bitmap is omitted.

In addition, depending on whether a UE reports a bitmap (i.e., a bitmap to identify which coefficients are reported by one or more amplitude coefficient indicators and one or more phase coefficient indicators) included in a PMI, in the mapping/correspondence relationship (or table), a granularity of amplitude and/or a table size (or a bit size of an amplitude coefficient indicator, e.g. 3 bits or 4 bits) may be configured/defined differently. In this case, the configuration information may include information on a granularity of amplitude and/or a table size (or, a bit size of an amplitude coefficient indicator) for the mapping/correspondence relationship (or table) used when reporting of a bitmap is omitted.

In addition, although a plurality of mapping/correspondence relationships (or tables) between amplitude coefficient indicators and amplitude coefficients are predefined when bitmap reporting is not omitted, when bitmap reporting is omitted, a single mapping/correspondence relationship (or table) can be used among a plurality of mapping/correspondence relationships (or tables). In this case, the configuration information may include information on a single mapping/correspondence relationship (or table) used when reporting of a bitmap is omitted.

In addition, according to the above-described Proposal #A1-3, the configuration information related to CSI may include information for a UE to determine whether a bitmap (i.e., a bitmap to identify which coefficients are reported by one or more amplitude coefficient indicators and one or more phase coefficient indicators) is included in a PMI and reported. For example, this information may include information on a threshold for a number of non-zero coefficients in order for a UE to determine whether to report a bitmap according to a number of NZCs.

A UE receives a CSI-RS from a base station on one or more CSI-RS resources (S802).

Here, a UE may receive a CSI-RS through one or more antenna ports on one or more CSI-RS resources based on the configuration information.

A UE transmits channel state information (CSI) feedback (report) to a base station (S803).

Here, channel state information (CSI) feedback (report) may be transmitted through an uplink physical layer channel (e.g., PUCCH or PUSCH).

The CSI reported by a UE to a base station can be derived/generated based on the above-described proposed method (e.g., any one or a combination of Proposal #A1/ #A1-1/#A1-2/#A1-3).

For example, CSI may include CSI part 1 and CSI part 2, and CSI part 2 may include a PMI corresponding to indexes of a codebook for indicating a precoding matrix. Here, the codebook may correspond to a codebook based on linear combining. Additionally, the PMI may include one or more amplitude coefficient indicators for indicating amplitude coefficients and/or one or more phase coefficient indicators for indicating phase coefficients.

Additionally, CSI part 2 may include a bitmap for identifying which coefficients are reported by the one or more amplitude coefficient indicators and the one or more phase coefficient indicators. Additionally, a number of non-zero amplitude coefficients and phase coefficients summed across all layers may be included in CSI part 1.

However, based on the above-described proposed method (e.g., any one or a combination of Proposal #A1/#A1-1/ #A1-2/#A1-3), the bitmap may not be reported (i.e., reporting may be omitted) in CSI part 2 (e.g., PMI).

For example, according to Proposal #A1 described above, if reporting of a bitmap is omitted, although a mapping/correspondence (or table) indicating a non-zero amplitude coefficient according to each of the values of amplitude coefficient indicators is predefined/preconfigured, an amplitude coefficient for a specific value of an amplitude coefficient indicator may be regarded as 0 by a network and/or UE.

Additionally, a phase coefficient corresponding to the amplitude coefficient considered to be 0 depending on the specific value of the amplitude coefficient indicator may not be reported in the PMI. That is, if an amplitude coefficient is reported as 0 for a specific SD basis-FD basis combination, reporting on a phase coefficient value for the combination may be omitted.

In addition, according to Proposal #A1-1 described above, if the bitmap is configured/indicated not to be reported in a PMI by the configuration information, reporting of the bitmap may be omitted in the PMI.

Additionally, according to Proposal #A2 described above, when reporting of a bitmap is omitted, a mapping/correspondence (or table) between amplitude coefficients indicator and amplitude coefficients may be defined/configured differently (compared to when reporting of a bitmap is performed). For example, an amplitude granularity (i.e. step size, e.g. −3 dB, −1.5 dB) and/or mapping/correspondence (or table) size (or a bit size of an amplitude coefficient indicator, e.g. 3 bits or 4 bits) may be defined/configured differently. In this case, a value of the reported amplitude coefficient indicator can be interpreted based on the defined/ configured mapping/correspondence (or table).

In addition, according to Proposal #A2 described above, if reporting of a bitmap is omitted, a mapping/correspondence (or table) between amplitude coefficient indicators and amplitude coefficients defined to include (i.e., to include an amplitude coefficient of 0) a value of an amplitude coefficient indicator indicating an amplitude coefficient of 0 may be used. In this case, a value of the reported amplitude coefficient indicator can be interpreted based on the corresponding mapping/correspondence (or table).

In addition, even though multiple mappings/correspondences (or tables) between amplitude coefficient indicators and amplitude coefficients are predefined when bitmap reporting is not omitted, when bitmap reporting is omitted, a single mapping/correspondence relationship (or table) can be used among multiple mappings/correspondences (or tables). In this case, a value of the reported amplitude coefficient indicator can be interpreted based on the corresponding mapping/correspondence (or table).

In addition, according to Proposal #A3 described above, a UE can receive information to determine whether to report a bitmap from a network. For example, this information may include information on a threshold for a number of non-zero coefficients in order for a UE to determine whether to report a bitmap according to a number of NZCs. In this case, when a number of non-zero amplitude coefficients and/or phase coefficients per layer or summed across all layers is greater than (or greater than or equal to) the threshold, the bitmap may not be reported in the PMI.

FIG. 9 is a diagram illustrating an operation of a base station in a method for transmitting and receiving channel state information according to an embodiment of the present disclosure.

FIG. 9 exemplifies an operation of a base station based on the above-described proposed method (e.g., any one or a combination of Proposal #A1/#A1-1/#A1-2/#A1-3). FIG. 9 is only for convenience of description, but it is not intended to limit a scope of the present disclosure. Some step(s) shown in FIG. 9 may be omitted according to a situation and/or a configuration, etc. In addition, a base station in FIG. 9 is only one example, and may be implemented as a device illustrated in FIG. 10. For example, a processor (102/202) of FIG. 10 may control to transmit and receive channel/signal/data/information, etc. (e.g., RRC signaling, MAC CE, DCI for UL/DL scheduling, SRS, PDCCH, PDSCH, PUSCH, PUCCH, etc.) by using a transceiver (106/206), and control to store transmitted or received channel/signal/data/information in a memory (104/204).

Referring to FIG. 9, a base station transmits configuration information related to channel state information (CSI) to a UE (S901).

The configuration information related to the CSI may include at least one of information related to CSI-IM (inter-ference management) resource, information related to CSI measurement configuration, information related to CSI resource configuration, information related to CSI-RS resource or information related to CSI report configuration.

In addition, the configuration information related to CSI may include information on the above-described proposed method (e.g., any one or a combination of Proposal #A1/#A1-1/#A1-2/#A1-3).

For example, configuration to Proposal #A1-1 described above, the setting information may include information for configuring/indicating that a bitmap is not reported in a PMI.

For example, according to Proposal #A1-2 described above, depending on whether a UE reports a bitmap (i.e., a bitmap to identify which coefficients are reported by one or more amplitude coefficient indicators and one or more phase coefficient indicators) included in a PMI, a mapping/corre-spondence relationship (or table, i.e. amplitude table) between a value of an amplitude coefficient indicator and a value of an amplitude coefficient may be applied differently. In this case, the configuration information may include information on a mapping/correspondence relationship (or table) used when reporting of a bitmap is omitted.

In addition, depending on whether a UE reports a bitmap (i.e., a bitmap to identify which coefficients are reported by one or more amplitude coefficient indicators and one or more phase coefficient indicators) included in a PMI, in the mapping/correspondence relationship (or table), a granular-ity of amplitude and/or a table size (or a bit size of an amplitude coefficient indicator, e.g. 3 bits or 4 bits) may be configured/defined differently. In this case, the configuration information may include information on a granularity of amplitude and/or a table size (or, a bit size of an amplitude coefficient indicator) for the mapping/correspondence rela-tionship (or table) used when reporting of a bitmap is omitted.

In addition, although a plurality of mapping/correspon-dence relationships (or tables) between amplitude coefficient indicators and amplitude coefficients are predefined when bitmap reporting is not omitted, when bitmap reporting is omitted, a single mapping/correspondence relationship (or table) can be used among a plurality of mapping/correspon-dence relationships (or tables). In this case, the configuration information may include information on a single mapping/correspondence relationship (or table) used when reporting of a bitmap is omitted.

In addition, according to the above-described Proposal #A1-3, the configuration information related to CSI may include information for a UE to determine whether a bitmap (i.e., a bitmap to identify which coefficients are reported by one or more amplitude coefficient indicators and one or more phase coefficient indicators) is included in a PMI and reported. For example, this information may include infor-mation on a threshold for a number of non-zero coefficients in order for a UE to determine whether to report a bitmap according to a number of NZCs.

A base station transmits a CSI-RS to a UE on one or more CSI-RS resources (S902).

Here, a base station may transmit, to a UE, a CSI-RS through one or more antenna ports on one or more CSI-RS resources based on the configuration information.

A base station receives channel state information (CSI) feedback (report) from a UE (S903).

Here, channel state information (CSI) feedback (report) may be transmitted through an uplink physical layer channel (e.g., PUCCH or PUSCH).

The CSI reported by a UE to a base station can be derived/generated based on the above-described proposed method (e.g., any one or a combination of Proposal #A1/#A1-1/#A1-2/#A1-3).

For example, CSI may include CSI part 1 and CSI part 2, and CSI part 2 may include a PMI corresponding to indexes of a codebook for indicating a precoding matrix. Here, the codebook may correspond to a codebook based on linear combining. Additionally, the PMI may include one or more amplitude coefficient indicators for indicating amplitude coefficients and/or one or more phase coefficient indicators for indicating phase coefficients.

Additionally, CSI part 2 may include a bitmap for iden-tifying which coefficients are reported by the one or more amplitude coefficient indicators and the one or more phase coefficient indicators. Additionally, a number of non-zero amplitude coefficients and phase coefficients summed across all layers may be included in CSI part 1.

However, based on the above-described proposed method (e.g., any one or a combination of Proposal #A1/#A1-1/#A1-2/#A1-3), the bitmap may not be reported (i.e., report-ing may be omitted) in CSI part 2 (e.g., PMI).

For example, according to Proposal #A1 described above, if reporting of a bitmap is omitted, although a mapping/correspondence (or table) indicating a non-zero amplitude coefficient according to each of the values of amplitude coefficient indicators is predefined/preconfigured, an ampli-tude coefficient for a specific value of an amplitude coeffi-cient indicator may be regarded as 0 by a network and/or UE.

Additionally, a phase coefficient corresponding to the amplitude coefficient considered to be 0 depending on the specific value of the amplitude coefficient indicator may not be reported in the PMI. That is, if an amplitude coefficient is reported as 0 for a specific SD basis-FD basis combina-tion, reporting on a phase coefficient value for the combi-nation may be omitted.

In addition, according to Proposal #A1-1 described above, if the bitmap is configured/indicated not to be reported in a PMI by the configuration information, reporting of the bitmap may be omitted in the PMI.

Additionally, according to Proposal #A2 described above, when reporting of a bitmap is omitted, a mapping/corre-spondence (or table) between amplitude coefficients indicator and amplitude coefficients may be defined/configured differently (compared to when reporting of a bitmap is performed). For example, an amplitude granularity (i.e. step size, e.g. −3 dB, −1.5 dB) and/or mapping/correspondence (or table) size (or a bit size of an amplitude coefficient indicator, e.g. 3 bits or 4 bits) may be defined/configured differently. In this case, a value of the reported amplitude coefficient indicator can be interpreted based on the defined/configured mapping/correspondence (or table).

In addition, according to Proposal #A2 described above, if reporting of a bitmap is omitted, a mapping/correspondence (or table) between amplitude coefficient indicators and amplitude coefficients defined to include (i.e., to include an amplitude coefficient of 0) a value of an amplitude coefficient indicator indicating an amplitude coefficient of 0 may be used. In this case, a value of the reported amplitude coefficient indicator can be interpreted based on the corresponding mapping/correspondence (or table).

In addition, even though multiple mappings/correspondences (or tables) between amplitude coefficient indicators and amplitude coefficients are predefined when bitmap reporting is not omitted, when bitmap reporting is omitted, a single mapping/correspondence relationship (or table) can be used among multiple mappings/correspondences (or tables). In this case, a value of the reported amplitude coefficient indicator can be interpreted based on the corresponding mapping/correspondence (or table).

In addition, according to Proposal #A3 described above, a base station can transmit information to determine whether to report a bitmap to a UE. For example, this information may include information on a threshold for a number of non-zero coefficients in order for a UE to determine whether to report a bitmap according to a number of NZCs. In this case, when a number of non-zero amplitude coefficients and/or phase coefficients per layer or summed across all layers is greater than (or greater than or equal to) the threshold, the bitmap may not be reported in the PMI.

General Device to which the Present Disclosure May be Applied

FIG. 10 is a diagram which illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a user equipment (UE), from a base station, configuration information related to channel state information (CSI);
receiving, by the UE, from the base station, a CSI-reference signal (CSI-RS) on one or more CSI resources; and
transmitting, by the UE, to the base station, the CSI based on the configuration information,
wherein the CSI includes a precoding matrix indicator (PMI) corresponding to indices of a codebook for indicating a precoding matrix,
wherein the PMI includes one or more amplitude coefficient indicators for indicating an amplitude coefficient and one or more phase coefficient indicators for indicating a phase coefficient, and
wherein whether a bitmap for identifying which coefficients are reported by the one or more amplitude coefficient indicators and the one or more phase coefficient indicators is reported in the PMI is determined based on a specific value for a number of non-zero amplitude coefficients and phase coefficients summed across all layers.

2. The method of claim 1, wherein the configuration information includes information for determining the specific value.

3. The method of claim 1, wherein the codebook is a codebook based on linear combining.

4. A user equipment (UE) comprising:
at least one transceiver for transmitting and receiving a wireless signal; and
at least one processor for controlling the at least one transceiver,
wherein the at least one processor configured to:
receive, from a base station, configuration information related to channel state information (CSI);
receive, from the base station, a CSI-reference signal (CSI-RS) on one or more CSI resources; and
transmit, to the base station, the CSI based on the configuration information,
wherein the CSI includes a precoding matrix indicator (PMI) corresponding to indices of a codebook for indicating a precoding matrix,
wherein the PMI includes one or more amplitude coefficient indicators for indicating an amplitude coefficient and one or more phase coefficient indicators for indicating a phase coefficient, and
wherein whether a bitmap for identifying which coefficients are reported by the one or more amplitude coefficient indicators and the one or more phase coefficient indicators is reported in the PMI is determined based on a specific value for a number of non-zero amplitude coefficients and phase coefficients summed across all layers.

5. A base station comprising:
at least one transceiver for transmitting and receiving a wireless signal; and
at least one processor for controlling the at least one transceiver,
wherein the at least one processor configured to:
transmit, to a user equipment (UE), configuration information related to channel state information (CSI);
transmit, to the UE, a CSI-reference signal (CSI-RS) on one or more CSI resources; and
receive, from the UE, the CSI based on the configuration information, wherein the CSI includes a precoding matrix indicator (PMI) corresponding to indices of a codebook for indicating a precoding matrix,
wherein the PMI includes one or more amplitude coefficient indicators for indicating an amplitude coefficient and one or more phase coefficient indicators for indicating a phase coefficient, and
wherein whether a bitmap for identifying which coefficients are reported by the one or more amplitude coefficient indicators and the one or more phase coefficient indicators is reported in the PMI is determined based on a specific value for a number of non-zero amplitude coefficients and phase coefficients summed across all layers.

6. The base station of claim 5, wherein the configuration information includes information for determining the specific value.

7. The base station of claim 5, wherein the codebook is a codebook based on linear combining.

* * * * *